United States Patent
Enge

(10) Patent No.: US 7,871,145 B1
(45) Date of Patent: Jan. 18, 2011

(54) PRINTING METHOD FOR REDUCING STITCH ERROR BETWEEN OVERLAPPING JETTING MODULES

(75) Inventor: James M. Enge, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 7 days.

(21) Appl. No.: 12/505,562

(22) Filed: Jul. 20, 2009

(51) Int. Cl.
B41J 29/393 (2006.01)

(52) U.S. Cl. .......................... 347/19; 347/14
(58) Field of Classification Search .................. 347/14, 347/19
See application file for complete search history.

(56) References Cited

U.S. PATENT DOCUMENTS

| | | | |
|---|---|---|---|
| 4,977,410 A | 12/1990 | Onuki et al. | |
| 5,450,099 A | 9/1995 | Stephenson et al. | |
| 6,357,847 B1 | 3/2002 | Ellson et al. | |
| 6,540,315 B1 | 4/2003 | Nystrom et al. | |
| 6,547,370 B2 | 4/2003 | Mantell et al. | |
| 6,629,747 B1 * | 10/2003 | King et al. | 347/19 |
| 6,663,206 B2 | 12/2003 | Taylor | |
| 7,118,188 B2 | 10/2006 | Vilanova et al. | |
| 7,264,324 B2 | 9/2007 | Kovacs | |
| 7,309,118 B2 * | 12/2007 | Mizes et al. | 347/19 |
| 7,440,123 B2 | 10/2008 | Chodagiri et al. | |
| 2003/0132979 A1 | 7/2003 | Taylor | |
| 2004/0165054 A1 | 8/2004 | Saquib et al. | |
| 2005/0141001 A1 | 6/2005 | Watanabe | |

* cited by examiner

*Primary Examiner*—Matthew Luu
*Assistant Examiner*—Brian J Goldberg
(74) *Attorney, Agent, or Firm*—William R. Zimmerli

(57) ABSTRACT

A method of printing is described for a page-width printer including a line head having a plurality of jetting modules that are staggered in a page-width direction. In a set up procedure, a test pattern is printed using the nozzles of adjacent jetting modules, and the pattern is analyzed to detect a stitch error in the overlap regions. The results of this analysis is used to calculate a set of correction values to be applied to print data subsequently sent to nozzles of the adjacent jetting modules to make a correction for the stitch error. During a subsequent production run, the print data sent to the nozzles of the adjacent jetting modules is analyzed to sense an image content attribute, such as gray or density level, of the print data. These results of the analysis of the print data is then used to calculate a dynamic adjustment that is used to adjust the set of correction values calculated during the set up procedure. The line head is then used to print the corrected print data by applying the set of adjusted correction values to production print data subsequently sent to the jetting modules.

15 Claims, 18 Drawing Sheets

GAP OR "WHITE LINE"

— 8a

OVERLAP OR "DARK LINE"

— 8b

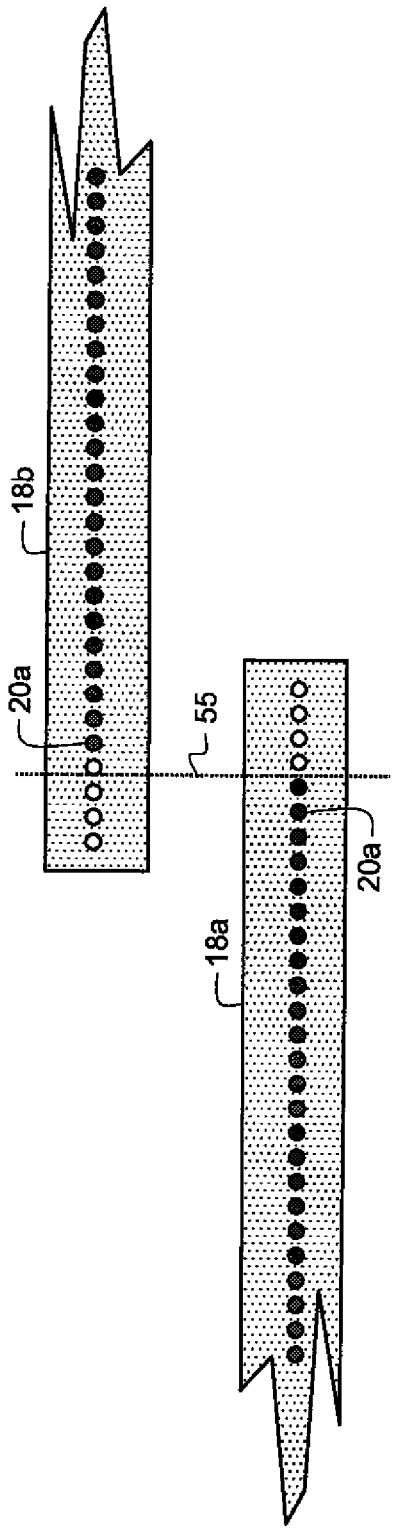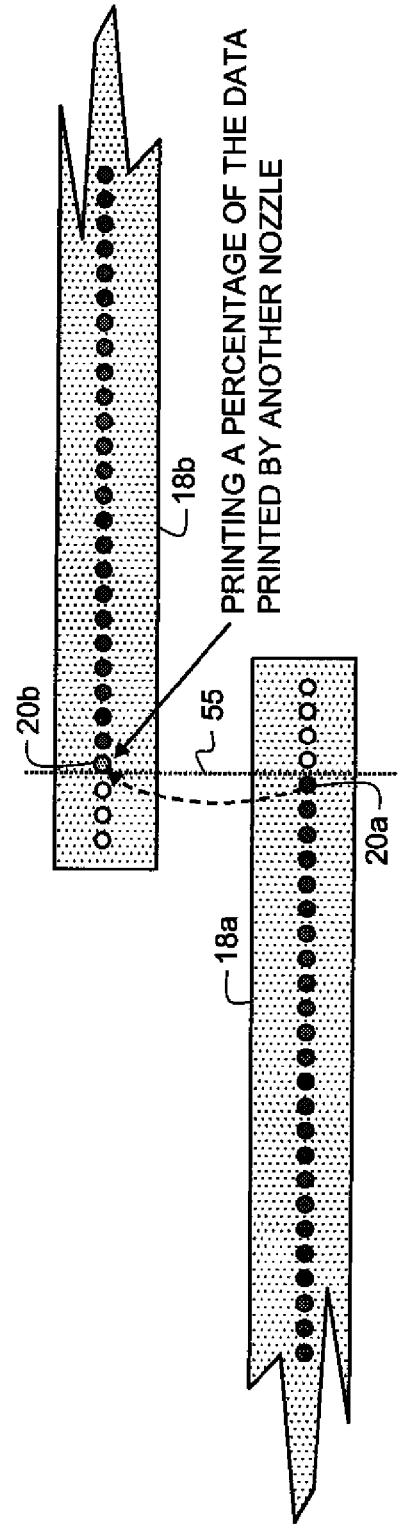

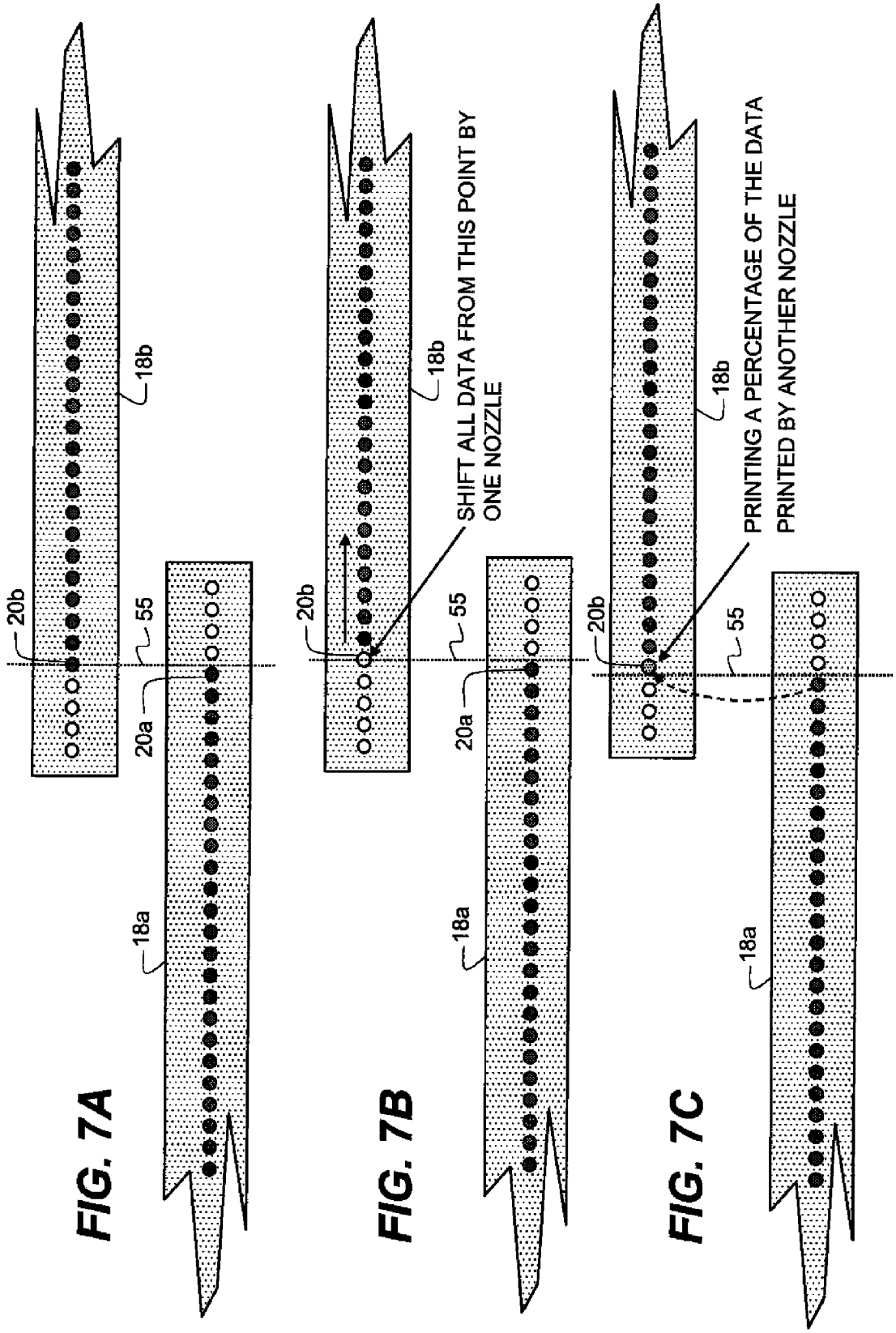

PROVIDES 11 PERCENTAGE LEVELS TO CHOOSE FROM

IF THE PIXEL MASK IS BLACK, THE RASTER DATA IS PRINTED
IF THE PIXEL MASK IS WHITE, THE RASTER DATA IN NOT PRINTED

PRINTING METHOD FOR REDUCING STITCH ERROR BETWEEN OVERLAPPING JETTING MODULES

FIELD OF THE INVENTION

The field of the invention relates to page-width printing systems using a line head including a plurality of jetting modules that are staggered in the page-width direction, and more particularly to methods and algorithms for joining the data from the jetting modules in the page-width direction.

BACKGROUND OF THE INVENTION

Stitching refers to the alignment of the print from multiple jetting modules for the purpose of creating the appearance of a single page-width line head. For example, as shown in FIG. 1, seven jetting modules 2—each three inches in length—can be stitched together at junctures 2a to form a twenty-one inch page-width line head 4. The page-width image data is processed and segmented into separate segments for each jetting module 2, and then a segment is sent—with an appropriate module-to-module delay to account for the staggered separation of the modules—to the print nozzles 6 of each jetting module for printing.

However, though it may be anticipated that the module-to-module alignment may be very good, mechanical tolerances may be difficult to consistently maintain and alignment will often not be perfect. Moreover, even if the jetting modules are perfectly aligned, differences in the nozzle aim between jetting modules may make them appear to be misaligned in the printed output. Consequently, this type of conventional, multi-segment jetting module configuration suffers from the drawback that the pitch of the output lines along the juncture 2a of adjacent jetting modules is irregular and thereby causes lines of lower (if too far apart) or higher (if too close together) density to appear at the juncture 2a of each jetting module segment and thus impairs the quality of the printed pattern of the output. In the output medium, such misalignment typically produces a gap or "white line" artifact 8a (as shown in FIG. 2A) or an overlap or "dark line" artifact 8b (as shown in FIG. 2B).

With a view to overcoming the presence of visible gaps or bands in the printed image, U.S. Pat. No. 7,118,188 deliberately sets the print dies of an inkjet printer with a small overlap, specifically no more than a few times the nozzle spacing. As a result of the redundancy of nozzles in the region where adjacent dies overlap, this gives flexibility for compensating for gaps or bands produced by inaccuracies in locating the dies and thus in setting the overlap dimension. Although, in an ideal case, 100% of the required amount of ink (maximum) would be printed by only 50% of the nozzles of each die in the overlap region, in practice more or fewer of the nozzles may be fired to compensate for imperfections. For example, if the overlap is less than intended, the production of a gap is avoided by firing some of the nozzles which would not be fired in the ideal case.

A printing mask is a means for selectively masking off certain nozzles, i.e., preventing these nozzles from firing even if printing instructions for those nozzles should include an instruction to fire. U.S. Pat. No. 7,118,188 further discloses a method of adding stitching masks to the printed image content, where artifacts in the printed image caused by the printing nozzles in the overlapping region are removed, either by (a) measuring the width of the band produced in the overlapping region and selecting an appropriate stitching mask for subsequent printing operations, or by (b) printing out a test pattern in which areas corresponding to a range of stitching masks are printed out and the optimal mask is selected for subsequent printing operations. The stitching mask is then added to, or superimposed on, the printing masks to ensure that the required correction is made independently of the content to be printed.

U.S. Pat. No. 7,118,188 further discloses that the target may comprise a array of target patches overlapping the die-to-die boundaries and including a range of stitching masks. The magnitudes of the die-to-die boundary artifacts are then assessed either by a user of the machine or automatically by an optical sensor/scanner system. In the first option, a user visually examines the patches in each row and selects the one with the better area fill uniformity at the printed region corresponding to the die-to-die boundary. The corresponding stitching mask is then applied to that die-to-die boundary in subsequent normal printing operations. In the second option, an optical sensor moves over all the patches detecting the boundary artifact level and supplies the most appropriate stitching mask for each die pair to a printer control system, where the masks will then be used in subsequent normal printing operations.

In relation to page-width thermal printers, U.S. Pat. Nos. 4,977,410 and 5,450,099 each disclose a thermal line printer including a plurality of staggered linear head segments arranged in a pair of parallel rows such that the head segments partly overlap with each other in overlapping regions near the ends of each segment. In U.S. Pat. No. 5,450,099, the print data in the overlapping region is interleaved to eliminate boundary artifacts at the juncture between segments. In U.S. Pat. No. 4,977,410, the initial assignment of image bit data to a segment in the overlapping region is shifted lengthwise to accommodate for boundary artifacts at the juncture between segments.

In relation to a carriage-type printer wherein a printhead is attached to a carriage that is reciprocated to print one swath of information at a time on a stationary receiving medium, U.S. Pat. No. 6,663,206 discloses methods for masking stitch errors between adjacent swaths laid down by operation of such a printer. In contrast with the afore-mentioned examples of page-width printers that utilizes a line head including an array of stationary printheads, after each swath is printed by the carriage-type printer the receiving medium is stepped a distance equal to the height of the swath so that the next printed swath overlaps the pixels from the last line of the previously printed swath. When a controller determines that a stitch joint error will occur based on the current relative location between the printhead and the medium and the location of the previous swath, the location of the next swath is adjusted relative to the position of the previous swath to eliminate the stitch joint error.

According to U.S. Pat. No. 6,663,206, the data is shifted in the printhead so that the data for the next swath is aligned within a predetermined pixel accuracy to the measured paper position, e.g., by having a later nozzle fire the pixel data originally set to be fired by the first nozzle of the printhead. In addition, the remaining stitch joint error is covered up by modifying the pixels at the stitch interface. In one example, the pixels created in the region between the last line of the previous swath and the first line of the next swath can be a duplicate line of either the last line of the previous swath or the first line of the next swath, where the size and/or density of the pixels can be changed. In another example, for situations where the stitch error is less than a pixel, in addition to shifting the data and firing the information set to be printed, the controller will also fire a line of fill pixels from the nozzle prior to and immediately adjacent to the first-fired nozzle. The purpose of a fill pixel is to bridge the gap between a printed pixel from the last fired nozzle of the previous swath and a corresponding adjacent printer pixel that will be formed when the first line of pixels is formed by the nozzle that will be used for the first line of pixels for the next swath. According to U.S. Pat. No. 6,663,206, the fill pixels create a printed image having more uniform continuity and density. The fill pixels are not produced for all of the pixels located in the last line of the previous swath. Instead, the fill pixels are produced when a printed pixel is located in the same position in both the previous swath and the next swath. The fill pixels can also be at a reduced size and/or density.

As thus understood in the prior art, stitch joint error in a drop-on-demand carriage-type system can be the result of a gap between the drop of one swath adjacent the stitch joint and the drop of an adjoining swath adjacent the same stitch joint. As explained in U.S. Pat. No. 6,663,206, the gap is usually caused by difficulties in producing adjacent swaths close enough together to mask this apparent error, and the correction must be produced on-the-fly during a production run. In contrast, as also explained in the '206 patent, a page-width printer includes a stationary printhead having a length sufficient to print across the width or length of the sheet of receiving medium. The receiving medium is continually moved past the page-width printhead in a direction substantially normal to the printhead length and at a constant or varying speed during the printing process. Thus, it would be understood that a page-width printer would avoid the need for on-the-fly corrections between swaths during a production run.

SUMMARY OF THE INVENTION

The applicant has observed that the correction amount obtained during a set-up procedure may not be suitable for all image content in a page-width printer, despite the same degree of misalignment of the jetting modules. In particular, the applicant has observed that the correction amount obtained during a set-up procedure may not be suitable for all density levels in the image. The applicant has observed that a test pattern, in which an area corresponding to a range of printing masks is printed out for the same stitch juncture, sometimes shows highlights corrected but dark regions misaligned, or other times shows dark regions corrected but highlights misaligned.

From such observations the applicant has discovered that corrections for nozzle alignments are not independent of image conditions and that it may be necessary to make the correction amount dynamic, meaning that it should dynamically change during a production run, that is, on-the-fly, based on an attribute of the image data. For example, the applicant has discovered that darker regions should receive more correction than highlight regions, and in some cases this may require more than one pixel or nozzle for correction. The applicant has further discovered that the problem can be solved by sensing an image attribute, such as the gray level of an image region, and using that attribute to calculate a dynamic correction that is applied to the printing mask during the production run.

The present invention is directed to overcoming one or more of the problems set forth above. Briefly summarized, according to one aspect of the invention, the invention resides in a method of printing involving a line head including a plurality of jetting modules that are staggered in a page-width direction such that adjacent jetting modules partially overlap each other, where each of the plurality of jetting modules include a plurality of nozzles wherein some of the nozzles of adjacent jetting modules overlap each other. During a setup or calibration procedure, test pattern print data is applied to the line head for printing a test pattern on a print media using the nozzles of adjacent jetting modules, and the test pattern is analyzed to detect a stitch error. Using the results of the analysis of the test pattern, a set of correction values are calculated, which are to be applied to print data subsequently sent to nozzles of the adjacent jetting modules to make a correction for the stitch error.

During a production run, the print data subsequently sent to the nozzles of the adjacent jetting modules is analyzed to sense an attribute of an image content of the print data, and the results of the analysis of the image content attribute are used to calculate a dynamic adjustment that is used to adjust the set of correction values. Then, the line head is used to print corrected print data by applying the set of adjusted correction values to production print data subsequently sent to the jetting modules.

The applicant has also observed that, for a page-width printer, an improved result is obtained if the correction is separated into a coarse correction, e.g., involving a shift of data, for whole numbers of pixels and a sub-pixel correction for a stitch gap of less that a pixel. From such observations, the applicant has discovered that an improved distribution of data in the highlights and a more uniform correction throughout the tone scale of the image being printed can be obtained if the sub-pixel correction is a proportion of the data raster printed by another nearby nozzle.

Accordingly, the present invention is further directed to overcoming one or more of the problems set forth above in connection with sub-pixel corrections. Briefly summarized, according to one aspect of the invention, the invention further resides in method of printing involving a line head including a plurality of jetting modules that are staggered in a page-width direction such that adjacent jetting modules partially overlap each other, where each of the plurality of jetting modules include a plurality of nozzles and wherein some of the nozzles of adjacent jetting modules overlap each other. Test pattern print data is applied to the line head for printing a test pattern on a print media using the nozzles of adjacent jetting modules, and the test pattern is analyzed to detect a stitch error.

Using the results of the analysis of the test pattern, a first set of correction values is calculated, which is to be applied to print data subsequently sent to nozzles of one of the adjacent jetting modules to make a coarse correction for the stitch error. Using the results of the analysis of the test pattern, a second set of correction values is calculated, which is to be applied to print data subsequently sent to one or more overlapping nozzles of one of the adjacent jetting modules to correct for sub-pixel stitch error, whereby the second set of correction values is proportional to print data applied to one or more of the overlapping nozzles. Then, the line head is used to print the corrected print data by applying the first set and the second set of correction values to production print data subsequently sent to the jetting modules.

The technical advantage of the invention is that it enables stitch error corrections to dynamically change during a production run based on an attribute, such as density, of the image data. Stitch artifacts corrected across a stitch joint according to prior procedures sometimes show highlights corrected but dark regions misaligned, or other times show dark regions corrected but highlights misaligned. The invention advantageously provides a uniform correction across the stitch joint where darker regions may need more correction than highlight regions, and vice versa. Furthermore, by making the sub-pixel correction a proportion of the data raster printed by another nearby nozzle, the distribution of data in the highlights is improved and a more uniform correction throughout the tone scale of the image being printed can be obtained.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 6A is a diagram of a portion of the line head shown in FIG. 3, showing a portion of two overlapping jetting modules that are misaligned in the horizontal direction, causing the "white line" artifact.

FIG. 6B is a diagram of the two overlapping jetting modules that are misaligned in the horizontal direction as shown in FIG. 6A, further illustrating a duplication correction applied to the raster generated by one of the non-printing nozzles in one of the adjacent jetting modules.

FIG. 7A is a diagram of a portion of the line head shown in FIG. 3, showing a portion of two overlapping jetting modules that are misaligned in the horizontal direction, causing the "dark line" artifact.

FIG. 7B is a diagram of the two overlapping jetting modules that are misaligned in the horizontal direction as shown in FIG. 7A, further illustrating a shifting correction applied to the rasters generated by a row of the printing nozzles in one of the jetting modules.

FIG. 7C is a diagram of the two overlapping jetting modules that are misaligned in the horizontal direction as shown in FIG. 7A, further illustrating a duplication correction applied to the raster generated by one of the nozzles after the shifting correction.

DETAILED DESCRIPTION OF THE INVENTION

Because printing systems employing stitching methods are well known, the present description will be directed in particular to elements forming part of, or cooperating more directly with, methods in accordance with the present invention. Elements useful in practicing the methods but not specifically shown or described herein may be selected from those known in the art. Certain aspects of the embodiments to be described may be provided in software. Given an understanding of the system as shown and described according to the invention in the following materials, software not specifically shown, described or suggested herein that is useful for implementation of the invention is conventional and within the ordinary skill in such arts.

Figure 3:
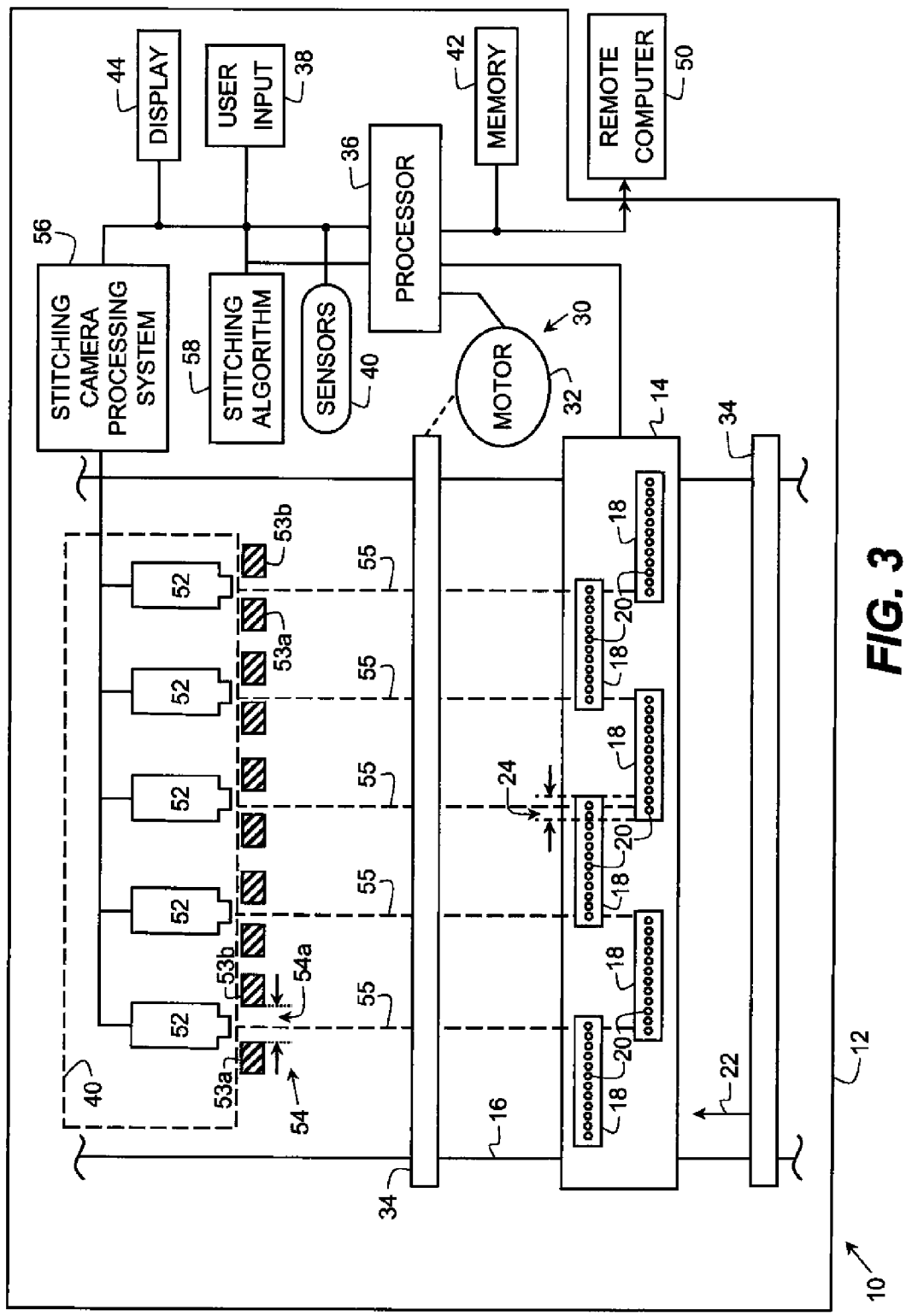
FIG. 3 is a diagram of a printer, including a line head having an array of staggered, overlapping jetting modules, incorporating a stitching algorithm according to the invention.

FIG. 3 shows an embodiment of a printer 10 incorporating the invention. In the embodiment of FIG. 3, the printer 10 comprises a housing 12 having a line head 14 that applies markings or otherwise forms an image on a receiver medium 16. The line head 14 includes a fixed array of overlapping jetting modules 18, where adjacent jetting modules 18 are staggered such that the nozzles 20 of adjacent jetting modules 18 overlap in an overlap region 24. (The overlap region 24 is shown for illustration in FIG. 3 between two of the jetting modules 18, but it should be understood that such overlap regions also exist between the other jetting modules.) The line head 14 can record images on the receiver medium 16 using a variety of known digital marking technologies including, but not limited to, drop on demand ink jet technology and continuous inkjet technology. For the purpose of illustrating the following discussions, the line head 14 will be described as being useful with continuous inkjet technology that generates monotone images such as black and white, grayscale or sepia toned images. However, it will be appreciated that these limitations are not necessary attributes of the invention and that the claimed methods herein described can be practiced, e.g., with a line head 14 that generates color images, or with known digital marking technologies including drop on demand ink jet technology.

FIG. 3 shows in part a schematic top plan view of a fixed, page-width line head 14 including six staggered jetting modules 18, each comprising at least one row of nozzles 20 which are arranged, in the preferred embodiment, to fire ink drops onto the receiver medium 16 as it is advanced through the printer 10 in a medium transport direction indicated by the arrow 22. The overlaps 24 due to the staggering between adjacent jetting modules 18 are shown on an exaggerated scale for the purposes of explanation, and effectively provide two page-width rows of nozzles. In practice, in-track timing delays for each jetting module are used to obtain in-track registration, that is, registration in the medium transport direction 22, for the printed output from the staggered modules 18. In the presently preferred embodiment, six approximately 4.25 inch width jetting modules 18 are staggered at 6 inches in the in-track (web) direction to provide a 24.5 inch print-width line head 14 in the cross-track (nozzle) direction. As shown in FIG. 3, jetting modules 18 are oriented such that the rows of nozzles 20 of jetting modules 18 are aligned along the cross track direction and positioned perpendicular to the direction 22 of medium transport. Other orientations of the rows of nozzles 22 are also permitted. For example, the rows of nozzles 20 can be positioned at a non-perpendicular, non-parallel angle relative to both the medium transport direction 22 and the cross track direction. Additionally, while two rows of jetting modules 18 are shown in FIG. 3, it is contemplated that more than two rows of jetting modules can be used with the present invention. For example, three rows, four rows, or more then four rows of jetting modules 18 can be implemented in a printing system incorporating the present invention.

A medium advance 30 is used to position the receiver medium 16 relative to the line head 14 to facilitate recording of an image on the receiver medium 16. The medium advance 30 can comprise any number of well-known systems for moving the receiver medium 16 within the printer 10, including a motor 32 driving pinch rollers 34, a motorized platen roller (not shown) or other well-known systems for the movement of paper or other types of receiver medium 16.

The line head 14 and the medium advance 30 are operated by a processor 36. The processor 36 can include but is not limited to a programmable digital computer, a programmable microprocessor, a programmable logic processor, a series of electronic circuits, a series of electronic circuits reduced to the form of an integrated circuit, or a series of discrete components. The processor 36 operates the printer 10 based in part upon input signals from one or more of a user input system 38, sensors 40, a memory 42, a stitching algorithm 58, and (when connected) a remote computer 50. A display 44 can provide to a user, without limitation, displays indicating information, images and operating data useful in implementing the stitching algorithm of the invention.

The user input system 38 (which, in certain applications, can be used to select masks for implementing the stitching algorithm of the invention) can comprise any form of transducer or other device capable of receiving an input from a user and converting this input into a form that can be used by the processor 36.

The memory 42 can include conventional memory devices including solid state, magnetic, optical or other data storage devices. The memory 42 can be fixed within the printer 10 or it can be removable. For instance, although not shown, the printer 10 may include a hard drive, a disk drive for a removable disk such as an optical, magnetic or other disk memory, or a memory card slot that holds a removable memory such as a removable memory card and has a removable memory interface for communicating with removable memory. Data including but not limited to control programs, digital images and metadata can also be stored external to the printer 10 in the remote computer system 50, such as a personal computer, a computer network or other digital system.

The sensors 40 can optionally include image capture devices or other light sensors known in the art that can be used to capture images of targets to determine, e.g., optimal correction amounts for the stitching algorithm according to the invention. This information can be captured and processed automatically and converted into a form that can be used by the processor 36 in governing operation of the line head 14 and jetting modules 18 and/or other systems of the printer 10. Alternatively, the images of the targets can be visually examined by an operator and correction amounts can be entered through the user input 48. The sensors 40 can also include positioning and other sensors used internally to sense operating conditions, such as web speed, and thereby control printer operations.

Figure 4:
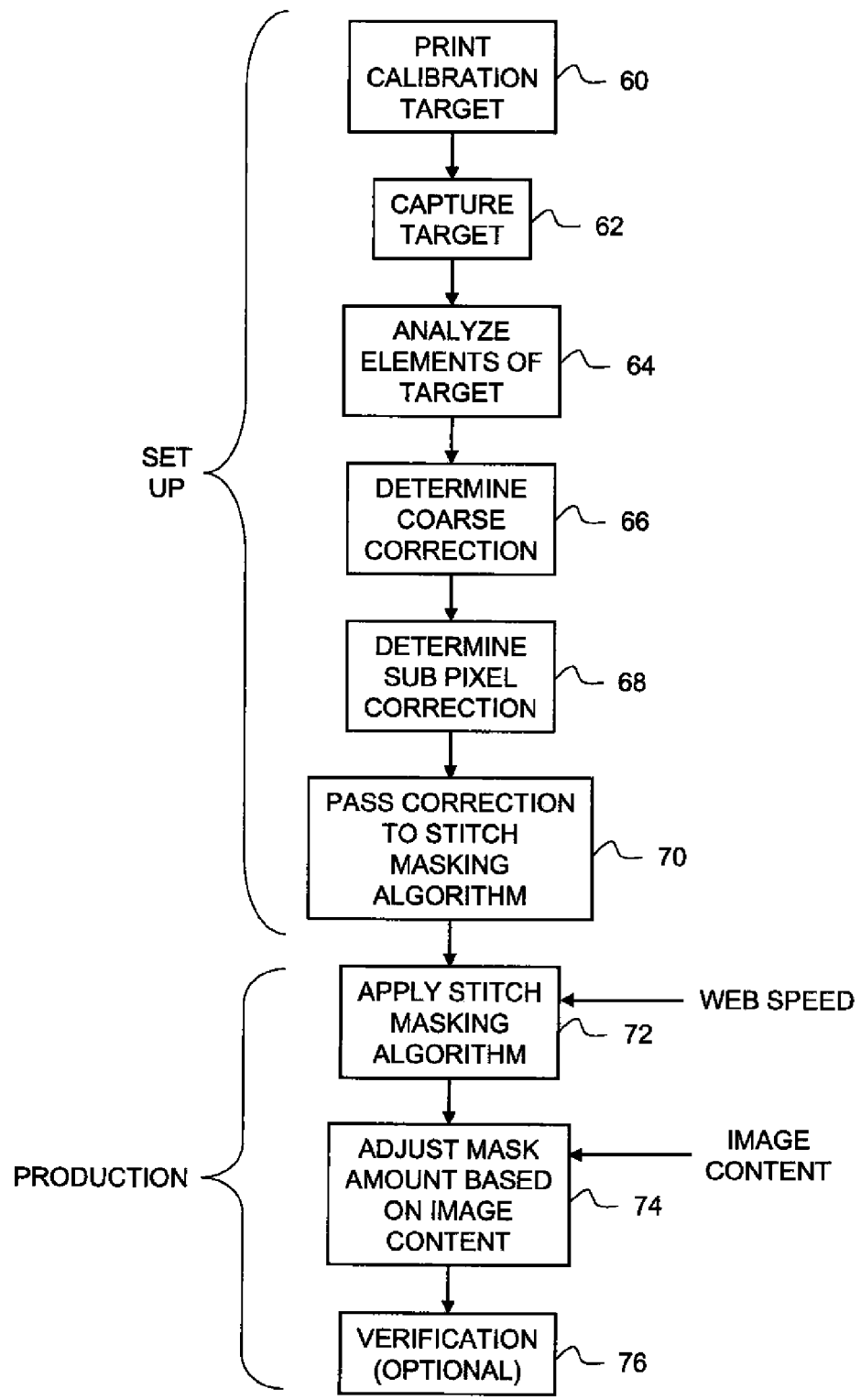
FIG. 4 is a flow diagram showing the correction steps involved in the overall stitching algorithm according to the invention.

According to a preferred embodiment, the sensors 40 are used in a stitching calibration process and further include a plurality of stitching cameras 52 oriented along the stitch joints 55 between the jetting modules 18 to capture a stitching calibration target 54. The captured target data is applied to a stitching camera processing system 56, which generates stitching parameters that are applied to the processor 56 and stored in the stitching algorithm 58. FIG. 4 is a flow diagram showing the steps involved in the overall stitching calibration process, and a subsequent production run using the results of the calibration process. The diagram generally shows setting up the module-to-module registration (with a first set of correction values) so that the modules within a line head are coarsely aligned to within a pixel and masking the remaining stitch artifacts from errors (with a second set of correction values) due to misalignment of less than one pixel (a sub-pixel correction).

Referring to FIG. 4, during the setup process, the stitching calibration target 54 is printed (in printing stage 60) at a speed suitable for capturing the target in capture stage 62 with the stitching cameras 52. The stitching camera processing system 56, which is driven by the processor 36, receives the captured data from the target 54 and analyzes the elements in an analytic stage 64. Following the analytic stage 64, the stitching camera processing system 56 calculates the start printing nozzle and the end printing nozzle for each jetting module in the coarse correction stage 66, which sets up the module-to-module registration so that the modules within a line head are aligned to within a pixel. The stitching camera processing system 56 also calculates a stitch masking correction amount for each stitch point in the sub-pixel correction stage 68, which masks the remaining stitch artifacts from errors due to misalignment of less than one pixel (a sub-pixel correction).

In closing the setup process, the parameters calculated above are applied in a correction transfer stage 70 to the stitching algorithm 58, which is operative during a production run. During the production run, the stitching algorithm 58 is applied to the print data in an algorithm application stage 72, whereby the parameters calculated above are used to select the start and end nozzles for each jetting module 18. The web speed is monitored during the production run by the sensors 40, and the stitch masking correction amount is adjusted with a look-up-table (not shown), with the web speed as input. Moreover, in the dynamic adjustment stage 74 the masking amount for each stitch point is dynamically adjusted based on the image content (print density compensation). (It is helpful to understand that the stitching cameras 52 are ordinarily not used during a production run.)

The overall calibration process can be run in a new calibration mode or in a verification mode. In the verification stage 76, the stitching calibration target 54 is printed (in printing stage 60) using previous or new corrections and the stitching camera processing system 56, which is driven by the processor 36 in the verification mode, captures the corrected elements of the target 54 and analyzes the elements in the analytic stage 64 to verify the corrective effect of corrections previously being used or to verify the corrective effect of newly calculated corrections. In the new calibration mode, the stitching calibration target 54 is printed (in printing stage 60) with no corrections applied and the stitching camera processing system 56 operates as described above in connection with FIG. 4 to generate new corrections.

A stitching algorithm attempts to optimize the data going to the nozzles, so that misalignment artifacts in the printed output are minimized or masked. In particular, it is helpful to explain the operation of the algorithm according to the present invention by referring to a pair of jetting modules, and more particularly to the overlap region where nozzles of the respective jetting modules overlap. Accordingly, and for the most part, the remaining Figures refer to a partial plan view of a portion of the line head 14, showing portions of two overlapping jetting modules 18a and 18b and their overlapping region 24. However, it should be understood that the disclosed operation and methodology of the stitching algorithm pertains to all of the jetting modules and all of the overlap regions. By overlapping the ends of two staggered jetting modules 18a and 18b by a small amount, it is possible to correct, as taught by the present invention, for virtually any horizontal misalignment error perpendicular to the paper transport direction 22. (As mentioned hereinbefore, it is assumed that vertical misalignment errors parallel to the paper transport direction can be conventionally compensated for by means of an in-track (web direction) timing delay from module-to-module, and this is not part of the present invention.)

Figure 1:
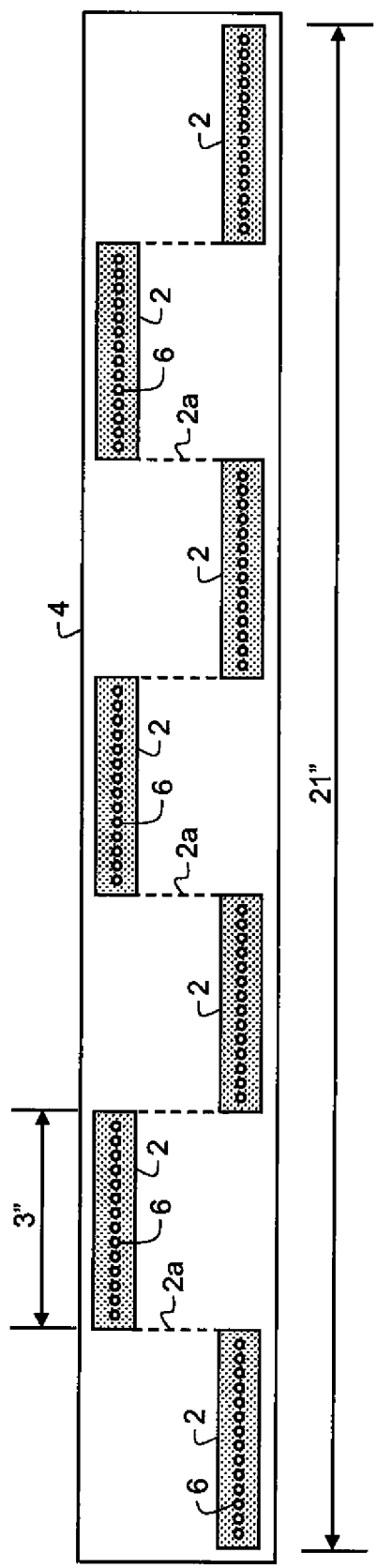
FIG. 1 is a prior art example of a plurality of jetting modules that are stitched to form a page-width line head.
Figure 2A:
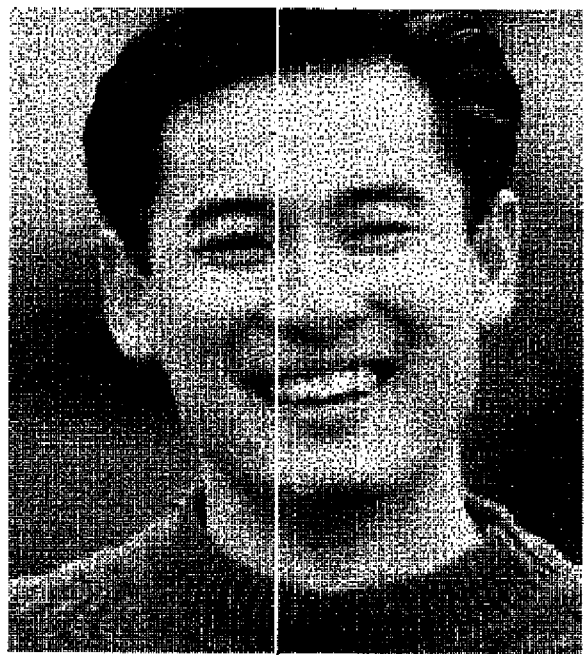
FIG. 2A shows a "white line" artifact due to a misalignment of the jetting modules shown in FIG. 1.
Figure 2B:
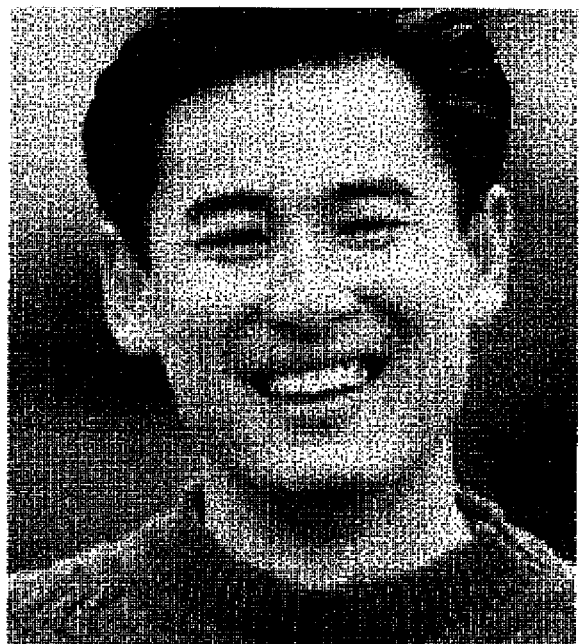
FIG. 2B shows a "dark line" artifact due to a misalignment of the jetting modules shown in FIG. 1.
Figure 5:
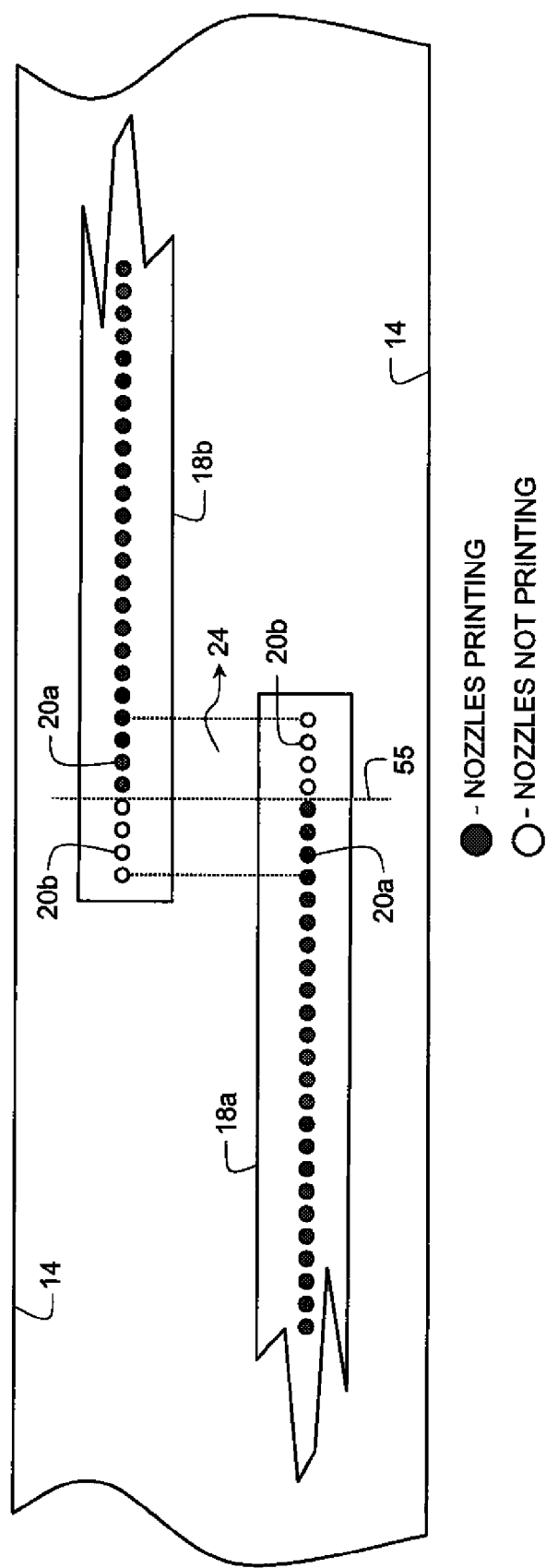
FIG. 5 is a diagram of the line head shown in FIG. 3, showing a portion of two overlapping jetting modules that are substantially perfectly aligned.

For example, FIG. 5 shows adjacent jetting modules 18a and 18b having an overlap of eight nozzles within an overlap region 24 across the stitch joint 55. The stitching algorithm then controls which nozzles of which jetting module 18a or 18b prints the data in the overlap region 24, and whether any shifting or other processing of the data needs to occur. In the nominal case illustrated in FIG. 5, where the print heads are substantially perfectly aligned perpendicular to the medium transport direction 22, nozzles 20a (shown as solid circles) are designated as printing nozzles and nozzles 20b (shown as open circles) are designated as nonprinting nozzles.

Where there is a horizontal misalignment artifact, that is, an artifact is produced due to cross-track (nozzle direction) misalignment between jetting modules 18a and 18b perpendicular to the medium transport direction 22, the stitching algorithm employs a data duplication and/or shifting method to compensate for the resulting artifact. FIG. 6A shows a horizontal misalignment causing a "white line" artifact, where there is a misregistration causing the first and last printing nozzles 20a of adjacent jetting modules 18a and 18b in the overlap region to be too far apart. In other words, due to a cross-track error in the relative positioning of two of the jetting modules 18a and 18b, a light band or gap is produced in the image content printed by the jetting modules 18a and 18b as the print medium 16 advances thereunder. (Such a gap 8a is shown on a print medium in FIG. 2A resulting, for purpose of illustration, from two misaligned jetting modules.) On the other hand, FIG. 7A shows a horizontal misalignment causing a "dark line" artifact, where there is a misregistration causing the first and last printing nozzles 20a of adjacent jetting modules in the overlap region to be too close together—even to the point of overlapping each other. (Such a dark band or line 8b is shown on a print medium in FIG. 2B resulting, for purpose of illustration, from two misaligned jetting modules.) In other words, due to an error in the relative positioning of the jetting modules 18a and 18b, a dark band is produced in the image content printed by the jetting modules 18a and 18b as the print medium 16 advances thereunder. Such overlap is expected to exist not only where the ink drops actually overlap in the direction perpendicular to the medium advance 22 but also in the case where the distance between the end printing nozzle 20a of jetting module 18a and the nearest beginning printing nozzle 20a of jetting module 18b is less then a nominal distance associated with a correct registration.

The type of misalignment and, consequently, the type of artifact produced by the misalignment, determines how the stitching algorithm corrects for the artifact. In stage 64 of FIG. 4, the target is analyzed and a determination is made as to whether there is any horizontal misalignment of the jetting module perpendicular to the paper transport direction, and further—if there is a misalignment—whether a gap resulting from such horizontal misalignment produces a "white line" artifact within the overlap region(s) of adjacent jetting modules or whether an overlap resulting from such horizontal misalignment produces a "dark line" artifact within the overlap region(s) of adjacent jetting modules. If there is a gap producing a "white line" artifact, the algorithm first determines whether the gap is greater than one pixel. If greater than one pixel, in the algorithm application stage 72 the algorithm utilizes the coarse correction generated in the stage 66 to shift the data through one of the adjacent jetting modules backward, that is, leftward in the figures, in the page-width direction to reduce the gap to less than one pixel. Then, or if the gap was less than one pixel to begin with, the algorithm utilizes the sub-pixel correction generated in the stage 68 to duplicate, as shown in the example of FIG. 6B, the existing data (for a raster) from the printing nozzle 20a in the overlap region of one of the adjacent jetting modules (module 18a in FIG. 6B), and applies a proportion of that duplicated data to at least one of the nonprinting nozzles (nozzle 20b) in the overlap region of the other adjacent jetting module (module 18b in FIG. 6B). (The "raster" is defined herein to refer to the column of data printed by one printing nozzle in the medium or web length direction, that is, in the medium transport direction.)

On the other hand, if the analytic stage 64 determines that there is an overlap resulting from such horizontal misalignment that produces a "dark line" artifact within the overlap region(s) of adjacent jetting modules, the algorithm application stage 72 utilizes the coarse correction generated in the stage 68 to shift the data through one of the adjacent jetting modules forward, that is, rightward in the figures, in the page-width direction to generate at least one more nonprinting nozzle in the overlap region of the jetting module wherein the "dark line" artifact occurs (thus creating a "white line" artifact corresponding to a gap of less than one pixel), and then utilizes the sub-pixel correction generated in stage 68 to duplicate existing data (raster) from a printing nozzle in the overlap region of the adjacent jetting module and print at least some proportion of the duplicated data to the newly generated nonprinting nozzle in the overlap region. Then, the processor 36 operates the line head whereby the method controls which jetting module prints data in the overlap region given that any shifting of data needs to occur.

In summary, and recalling that FIG. 6A shows a horizontal misalignment causing a "white line" artifact, where there is a misregistration causing the first and last printing nozzles 20a of adjacent jetting modules in the overlap region to be too far apart, FIG. 6B shows a nominally non-printing nozzle 20b in jetting module 18b filling in the "white line" artifact by printing a percentage of a raster that is duplicated from data applied to the last printing nozzle 20a in jetting module 18a. Recalling that FIG. 7A shows a horizontal misalignment causing a "dark line" artifact, where there is a misregistration causing the first and last printing nozzles 20a of adjacent jetting modules in the overlap region to be too close together—even to the point of overlapping each other, FIG. 7B shows all data directed to jetting module 18b shifted to the right by one nozzle to eliminate the overlap or closeness of the first and last printing nozzles 20a of adjacent jetting modules 18a and 18b in the overlap region. (If the "dark line" artifact is caused by print nozzle overlap greater than two pixels, then it may be necessary to shift data by more than one pixel.) As also shown in FIG. 7B, this shifting of data causes the "dark line" artifact to effectively become a "white line" artifact, that is, by creating—due to the shift—a non-printing nozzle 20b in the overlap region of jetting module 18b. As a consequence, and as shown in FIG. 7C, the newly created non-printing nozzle 20b in jetting module 18b fills in the "white line" artifact by printing a percentage of a raster that is duplicated from data directed to the last printing nozzle 20a in jetting module 18a.

In each case where there has been a misalignment, and where the method of correction calls for duplication, the spacing between the first and last printing nozzles of the adjacent jetting modules will be some proportion of the nominal spacing of perfectly aligned nozzles (as shown in FIG. 5). Where the spacing is exactly double the nominal spacing, that is, where the "white line" corresponds exactly to a single missing raster, then the nominally non-printing nozzle 20b in jetting module 18b fills in the "white line" artifact by printing 100% of a raster that is duplicated from data directed to the last printing nozzle 20a in jetting module 18a. However, where the spacing is only a proportion of the nominal spacing, that is, where the "white line" corresponds to less than all of the data from a single raster, then the nominally non-printing nozzle 20b in jetting module 18b fills in the "white line" artifact by printing a proportion of a raster that is duplicated from data directed to the last printing nozzle 20a in jetting module 18a.

Figure 8A:
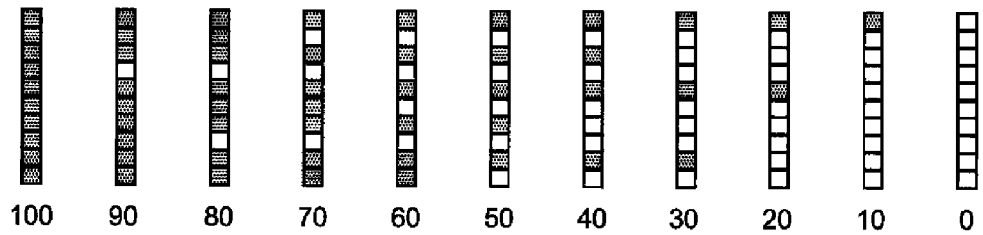
FIG. 8A is one embodiment of a proportional duplication correction applied to the raster generated by one of the nozzles in one of the jetting modules, where a mask is used to determine which data in the raster will be printed.
Figure 8B:
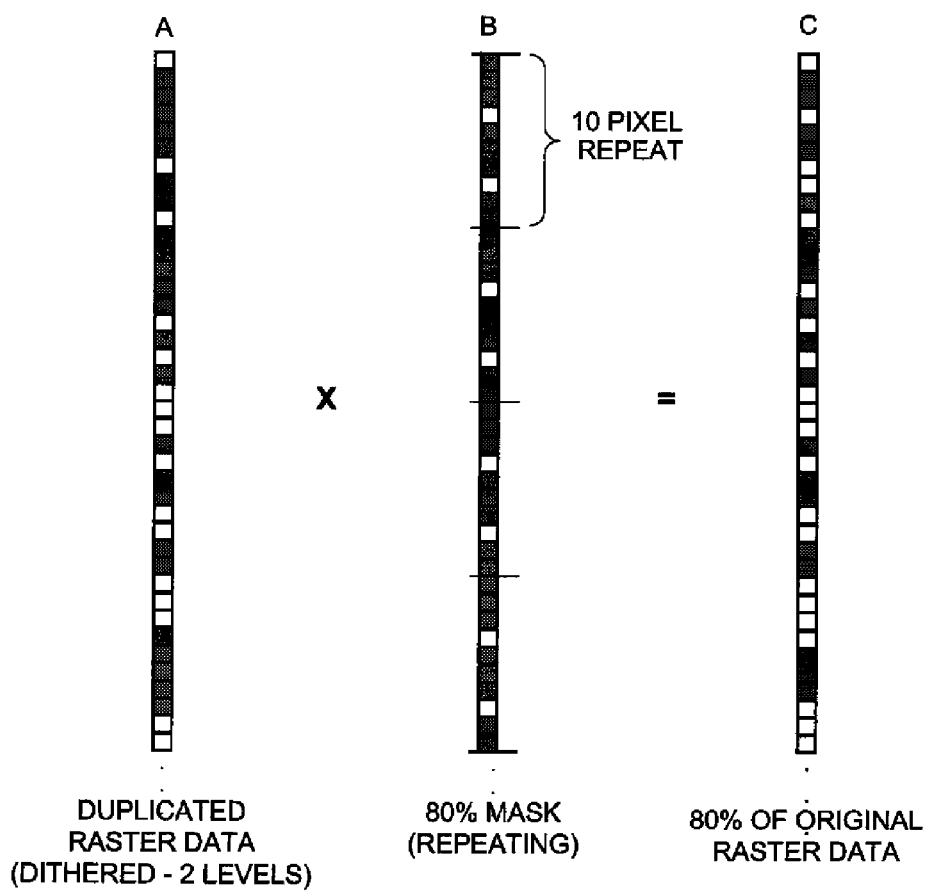
FIG. 8B is an example of an 80% mask applied to the duplicated raster data according to the embodiment described in FIG. 8A.

A proportional correction is made by printing a percentage of a duplicated raster. Recalling that a raster is defined herein to refer to the column of data printed by one printing nozzle along the medium or web length direction, that is, along the medium transport direction, one way of printing a percentage of a duplicated raster is to apply a mask to the data representing the raster, where the mask determines which data in the raster will be printed. FIG. 8A shows an example of such a technique using a 1×10 ordered dither mask (which would be repeated the length of the raster). As shown, this technique provides 11 percentage levels to choose from, that is, 100%, 90%, 80%, 70%, 60%, 50%, 40%, 30%, 20%, 10% and 0%. Where the pixel mask is black for a selected percentage, the raster data is printed and where the pixel mask is white for the selected percentage, the raster data is not printed. In practice, referring to FIG. 4, a mask is selected in the sub-pixel correction stage 68 based on the measured sub-pixel distance between the last printing nozzle 20a of the module 18a and the first printing nozzle of the module 18b (after shift correction), and the processor 36 applies the mask to the data. An example of this technique is shown in FIG. 8B for the selection of an 80% mask, where the mask only allows 8 out of 10 pixels to be printed. The mask is replicated by the processor 36 for the whole raster (shown for purpose of illustration only as four replications in the second column B in FIG. 8B) and applied pixel by pixel to the duplicated raster data in the first column A, resulting in 80% of the original raster data in the third column C. The resultant print data is then applied to an appropriate jetting module 18 in the line head 14.

For simplicity and clarity, the proportional correction is described herein in terms of the 1×10 ordered dither mask, shown in FIG. 8A. The invention is not limited to the use of that particular ordered dither mask. For example, masks having different pixel arrangements with similar coverage levels can be employed. Similarly, masks of different sizes, such as 1×15 or 1×20 can be employed. Further, a random masking process can be employed, where, for example, on a pixel by pixel basis the output of a random number generator is compared to the desired percentage value to determine whether the duplicated pixel data is to be printed.

In the technique employed in FIGS. 8A and 8B, a selected mask is replicated and applied pixel by pixel by the processor 36 to the duplicated raster data. In an alternative application of this concept, a threshold dither algorithm is instead applied by the processor 36 to the duplicated raster data. For example, the effect obtained by the individual 1×10 ordered masks shown in FIG. 8A can be combined into a threshold dither kernel, as follows, 1×10 dithered kernel=[10 80 40 100 20 70 50 90 30 60]

where the threshold value is defined by the amount of correction desired. Each value in the kernel represents a threshold in terms of a percentage, and a given pixel in the raster will print if its pixel position in the raster corresponds to a kernel percentage less than or equal to the selected percentage. In effect, this represents all the masks of FIG. 8A collapsed into a single threshold application. For example, for an 80% threshold all positions would print except the $4^{th}$ (100%) and $8^{th}$ (90%) positions—which is equivalent to the 80% mask illustrated in FIGS. 8A and 8B. As before, the usage of the threshold dither kernel is then repeated for the whole raster.

In the technique employed in FIGS. 8A and 8B, the selected mask is applied pixel by pixel by the processor 36 to the duplicated raster data whether or not a given pixel in the raster represents print drop data or non-print data. Since the purpose of the mask is to determine which data in the raster will be printed, in the alternative embodiment of proportional correction described above, the threshold dither algorithm is applied only to the pixels that actually contain print drop data. This alternative method is expressed in the flow diagram shown in FIG. 9A and in the example shown in FIG. 9B for a 60% correction. The method shown in FIG. 9A involves (as shown in counting stage 80) the processor 36 scanning down the duplicated raster (column A of FIG. 9B) and counting only the pixels that contain print data (cycling in blocks of 10). In the example shown in FIG. 9B, the outcome of the counting stage 80 is shown in the second column B for duplicated raster data equivalent to 19 potential ink drop locations. As shown, only 14 of these locations contain ink drop data and are therefore counted. Next, the output of the counting stage 80 is used as an index into a dither kernel (which occurs in index stage 82, and in the second column B in FIG. 9B, where each arrow 82a indicates a counted pixel). With the pixels thus identified, a correction threshold is applied (as shown in threshold stage 84) based on the values in the dither kernel. If the value from the dither kernel is greater than the desired correction amount, then the print data is removed for that pixel location (as shown in elimination stage 86). This is shown in the third column C of FIG. 9B for a 60% example, where the arrows 86a indicate remaining data that is not eliminated.

Figure 9A:
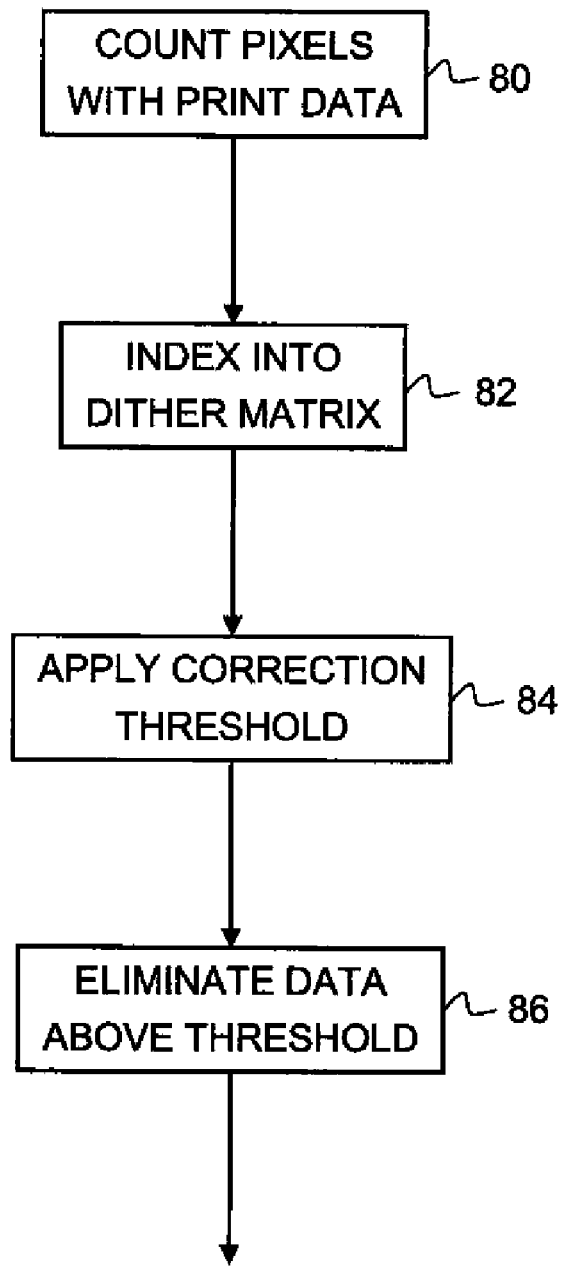
FIG. 9A is a flow diagram for applying a threshold dither algorithm only to the pixels that contain print drop data.
Figure 9B:
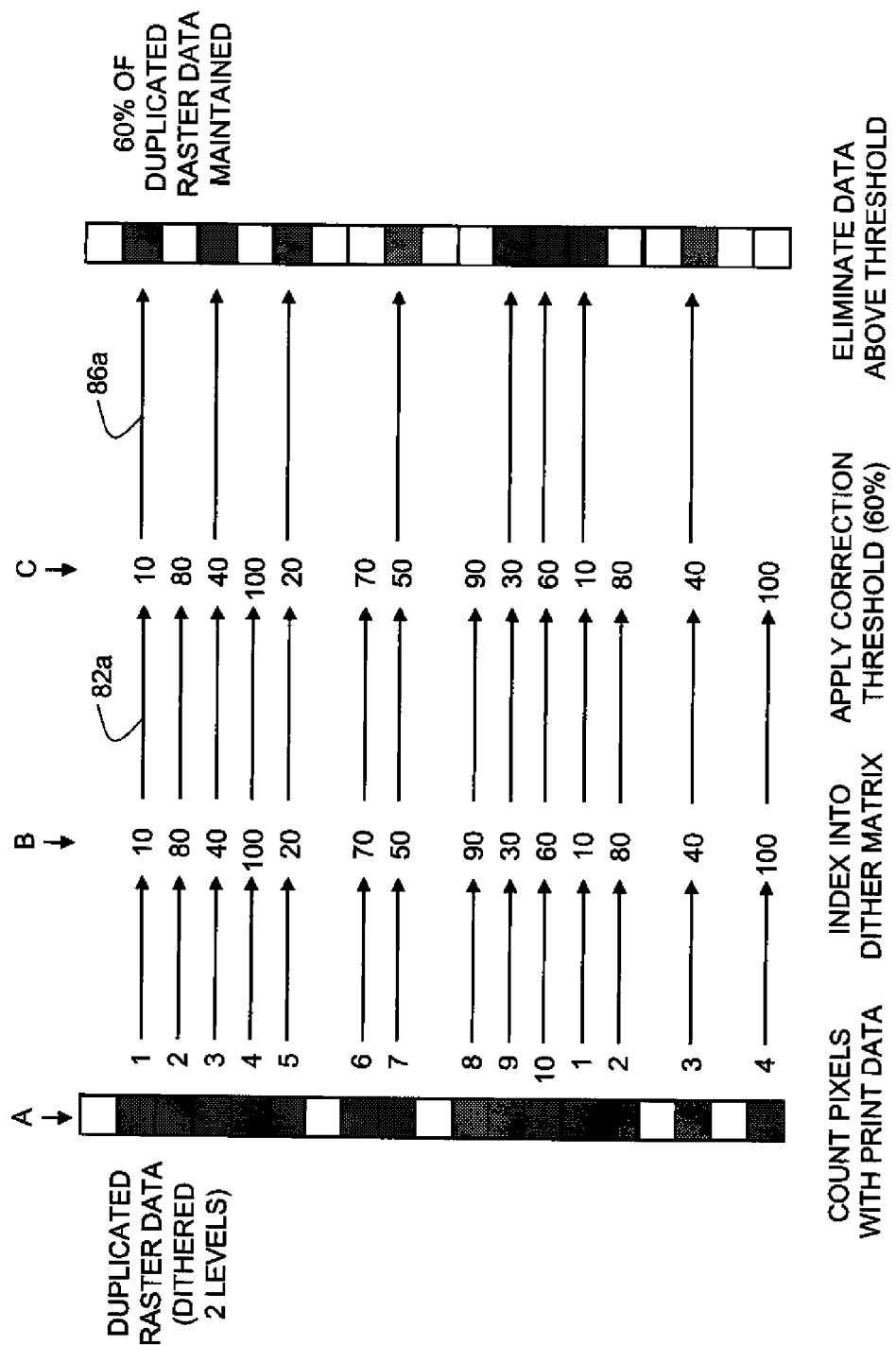
FIG. 9B shows an example of the method shown in FIG. 9A for a 60% correction.

In the correction process illustrated in FIGS. 9A and 9B, as well as FIGS. 8A and 8B, there remains the issue of determining the correct dither matrix, or the correct mask, that is, the desired amount of stitch error correction. The desired stitch error correction is determined either in an process involving the application of different masks or dither kernels together with the visual or automatic evaluation of a target image or, as will be explained, a correlation process of correlating actual misalignment to an optimum correction level. The first way of determining a desired stitch error correction is to have the printer 10 print a target in the overlap region 24 for each pair of staggered, overlapped jetting modules 18. The processor 36 processes the data such that the target contains varying degrees of correction by using different percentage masks, or different threshold kernel values.

Figure 10:
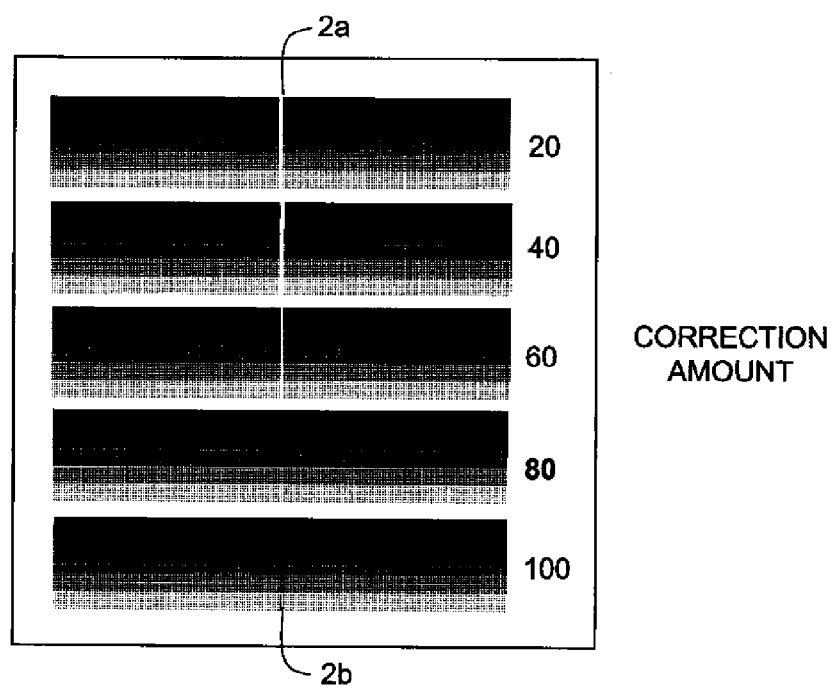
FIG. 10 shows a target for determining an optimum correction that is substantially consistent across several density levels.

An exemplary target print is shown in FIG. 10 for masks, or thresholds, producing a range of correction amounts—including 20%, 40%, 60%, 80% and 100% print drop. Then, the correction level is picked where the stitching artifact is least noticeable, and this will constitute the desired stitch error correction. For example, in FIG. 10 the stitching artifact appears as a "white line" artifact 2a for 20, 40, and 60% corrections or a dark line artifact 2b for a 100% correction, and the artifact—for this example—is least noticeable for a correction corresponding to an 80% print drop. Accordingly, the mask or kernel value providing the least noticeable rendition—80% in this example—is selected for the stitching algorithm 58 (FIG. 3). The appropriate correction level can be detected by a variety of methods, including without limitation visual inspection of the target; and an automated streak (band or gap) detection system.

In addition, The appropriate correction level can be detected by correlation of a correction factor with a known degree of jetting module misalignment, where the physical distance measurements determines the correction amount based on historical data. In practicing this method of detection, and in reference to FIG. 4, groups of nozzles in or near the overlap regions in each of the adjacent, overlapping jetting modules are designated to print a pattern of patches 53a and 53b that are separated by a measurable gap 54a overlying the stitch joint 55. (The historical data predetermines a nominal size for this gap that would indicate substantially perfect alignment between the jetting modules 18a and 18b, thus not requiring a stitch error correction.) Next, the target 54 is printed on the print medium 16 by activating the designated nozzles in the predetermined groups for each of the overlap regions 24. Then, after images of the patches 53a and 53b on the print medium 16 are captured by the stitching cameras 52, the gap 54a is measured by the stitching camera processing system 56. The actual gap measurement—which typically will deviate from the nominal gap length for perfect module-to-module alignment—can then be referenced to a table (not shown, but it may be stored in the memory 42 for use by the stitching camera processing system 56) that will indicate the amount of correction, based on knowing the nominal size for this gap, needed to eliminate the stitch error. As described earlier in this application, this correction may involve (a) shifting of print data, either forward or backward, and/or (b) masking of duplicated print data.

It should be apparent that correlation of a correction factor with a known degree of jetting module misalignment may take a number of variations from the procedure described above. For instance, it has been found useful to activate the nozzles in the predetermined groups for each of the overlap regions 24 so as to produce separated blocks of printed output, e.g., 5×5 sized blocks of print (pixel) data, that are strung out in the web length direction. Then, groups of blocks can be examined at one time. In one embodiment, the centroid of each block, or averaged sets of blocks, is calculated for blocks on either side of the stitch joint 55 and the gap between the centroids is compared with a centroid spacing predetermined from historical data for a nominal spacing that would produce perfect alignment between the jetting modules 18a.

The advantage of the technique illustrated in FIGS. 9A and 9B include more uniform distribution of data in the highlights and more uniform correction throughout the tonescale of the image being printed. However, the target illustrated in FIG. 10 shows an optimum correction that is substantially consistent across several (4) density levels, that is, where the same correction is equally effective for each of the density levels in the printed output. However, the same correction level may not be suitable for all density levels, e.g., darker regions may need more correction than highlight regions. Thus it may be desirable to make the correction amount dynamic, meaning that the correction amount should be capable of changing dependent on certain aspects of the image data, such as (without limitation) the print density of the image data. In the preferred embodiment, a dynamic correction amount is provided by applying an additional threshold or modification of the printing mask during the production run. For example, as shown in FIG. 4, in the dynamic adjustment stage 74 the masking amount for each stitch point is dynamically adjusted based on the image content (print density compensation).

Figure 11:
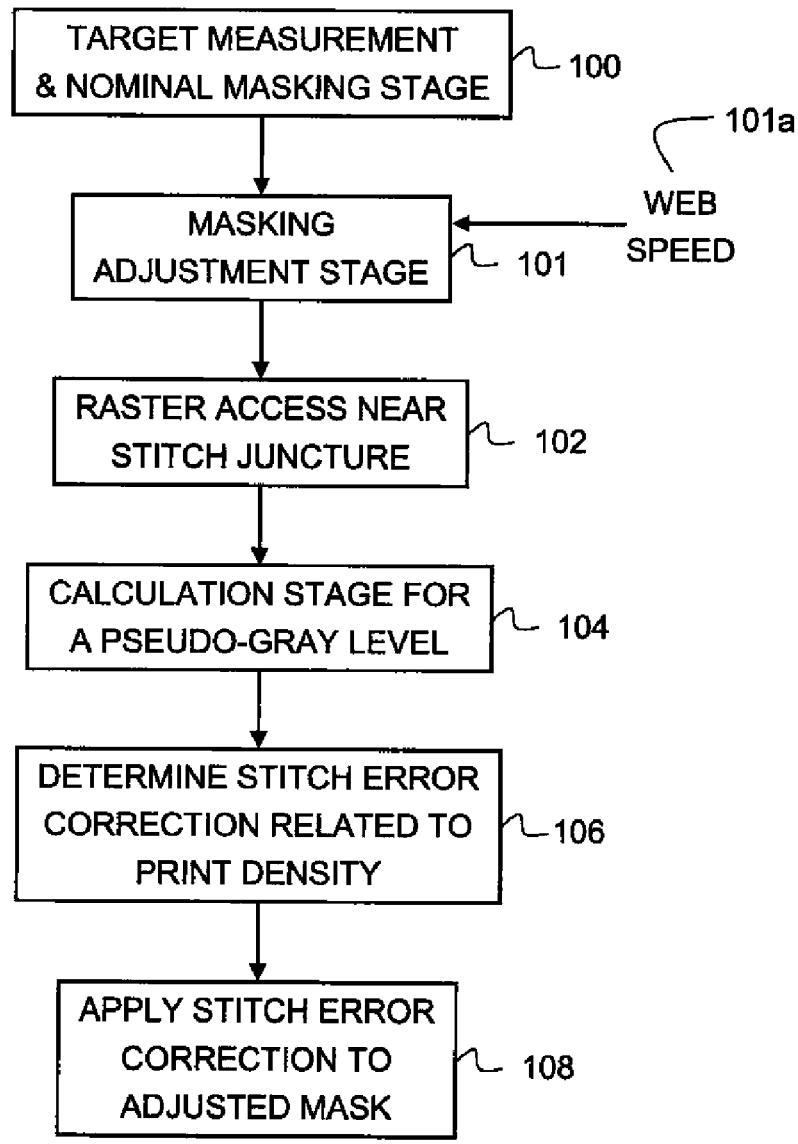
FIG. 11 shows a flow diagram of a method for generating a stitch error correction that is dependent on the print density of the image data.

FIG. 11 shows a flow diagram for generating a desired stitch error correction amount that is dependent on (at least one of) the print density of the image data and the web speed of the printer. The process begins (in target measurement and nominal masking stage 100) with the measurement of the stitching target 54 and the determination of a nominal stitch masking amount (as calculated according to FIGS. 9A and 9B, or as just described in relation to the target patches 53a and 53b) based on target measurements. Although the nominal stitch masking amount provides a nominal correction at each of the density levels based on measurements of the target, e.g., the gap 54a between the target patches 53a and 53b, the nominal stitch masking amount may need to be adjusted based on the web speed of the printer 10 because the gap will become larger at higher speeds. Accordingly, in the masking adjustment stage 101 (which may take the form of a look up table) the web speed 101a and the nominal mask from the previous stage 100 are taken as inputs and an adjusted mask is provided as an output. In one example, which is provided as an illustration without limitation, a slow speed may not require any adjustment while a medium speed would require a 10% adjustment to the nominal mask and a high speed would require a 20% adjustment to the nominal mask. In each case, the adjustment is an addition to the nominal masking amount such that, e.g., a 60% nominal mask should become a 70% mask for medium speeds and an 80% mask for high speeds—where more of the raster data is printed as the percentage increases.

In raster access stage 102, one or more rasters of print data are obtained pertaining to pixels in the overlap region(s) near a stitch juncture. (As set forth earlier in this application, each raster of print data comprises a column of data printed by one printing nozzle in the page-length direction, that is, perpendicular to the page-width direction.) In some cases, such as darker regions that require more correction than highlight regions, more than one raster may be required for the correction. Then (in gray level stage 104), a pseudo-gray level is calculated for individual pixels in the one or more rasters by processing the print data from a neighborhood of pixels within the one or more rasters including the individual pixel. Using the pseudo-gray level and the desired stitch error correction, a determination is made (in stitch error stage 106) as to a proper stitch error correction modification related to print density. Finally, the stitch error correction amount related to print density is used (in modification stage 108) to further modify, e.g., by thresholding, the masking amount applied to individual pixels.

In effect, the output of the processing stages shown, e.g., in FIG. 9A, which is produced in a set up procedure, is modified by the output of the processing stages shown in FIG. 11, which is produced during a production run. Thus, the offline set-up correction is dynamically modified by (at least one of) the density and web speed adjustments.

Figure 12:
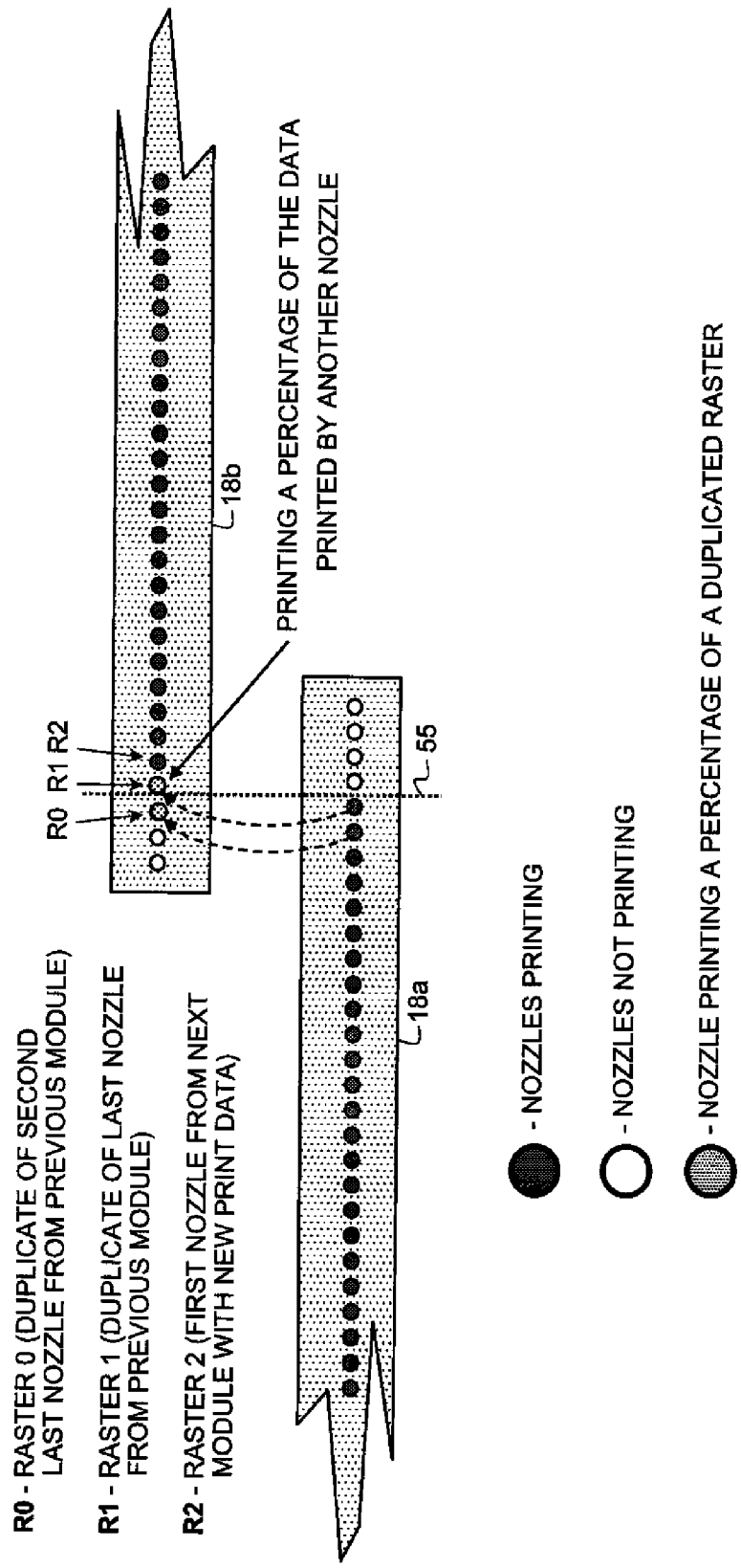
FIG. 12 is a diagram of a portion of two adjacent, overlapping jetting modules showing several rasters of print data in the overlap region near a stitch juncture that are obtained for processing according to the method shown in FIG. 11.

FIGS. 12-16 represent a preferred embodiment of a process for obtaining and applying a stitch error correction amount related to print density. The process identified in raster access stage 102 of FIG. 11 is accomplished as shown in FIG. 12, where several rasters of print data are obtained pertaining to pixels in the overlap region(s) near a stitch juncture. More specifically, raster R0 in jetting module 18b duplicates data from the second last nozzle of the jetting module 18a and raster R1 in jetting module 18b duplicates data from the last nozzle of the jetting module 18a. Raster R2 represents the data from the first nozzle in the jetting module 18b. As shown, a percentage of the duplicated data from the second last and the last nozzles of the jetting module 18a is used to print from the third and fourth nozzles of the jetting module 18b in the overlap region where the stitch juncture occurs. The data duplicated into the rasters R0 and R1 will be used, as follows, in the determination of the stitch error correction needed to account for variation in print density.

Figure 13:
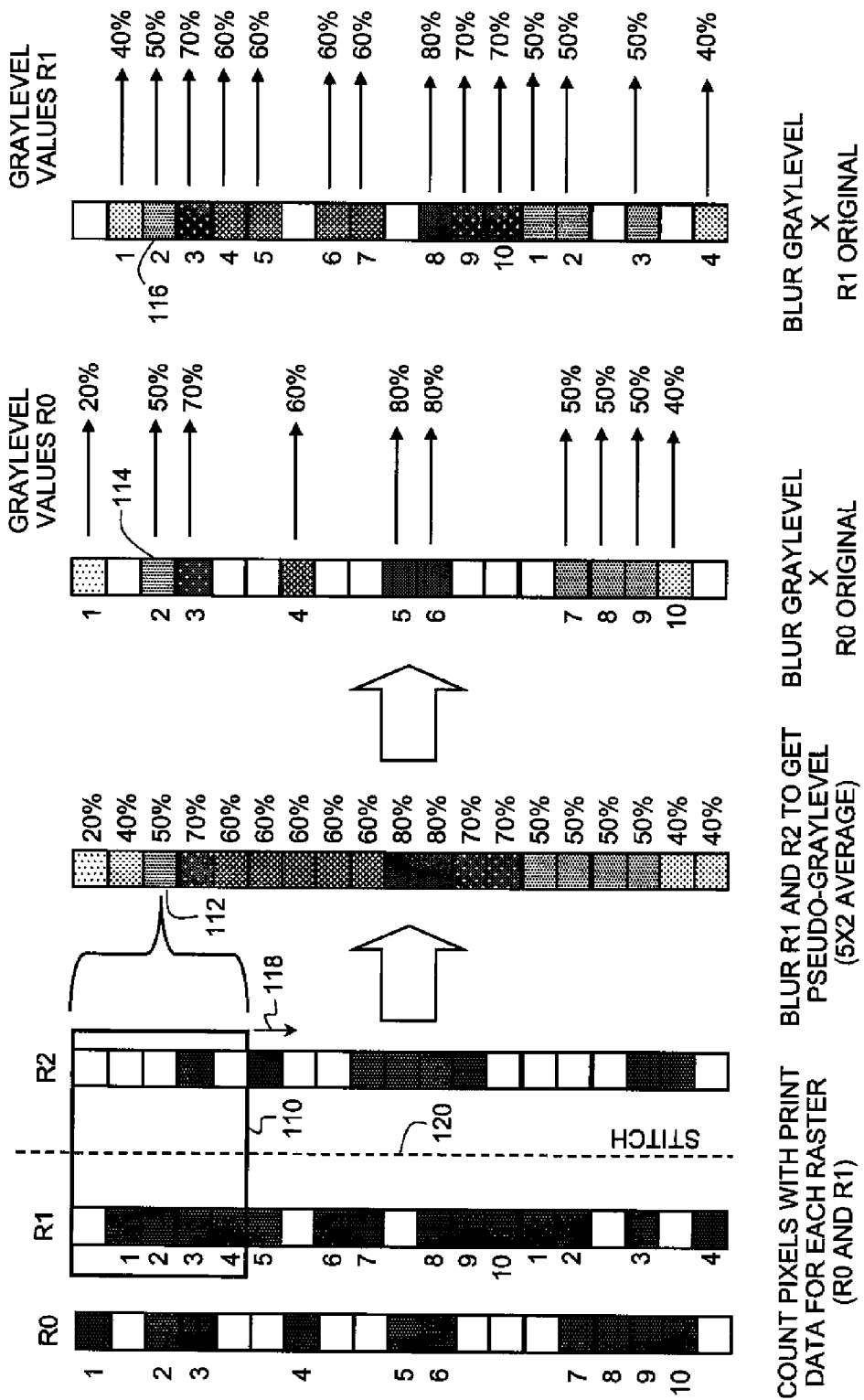
FIG. 13 is a diagram showing the calculation of pseudo-gray levels at the stitch joint, according to the method shown in FIG. 11, using print data from a neighborhood of pixels within the rasters of print data illustrated in FIG. 12.

The process identified in gray level stage 104 of FIG. 11 is accomplished as shown in FIG. 13, wherein print data within a neighborhood of pixels represented by a window 110 is averaged to determine, for example, a pseudo-gray level 112 appropriate for corresponding pixels 114 and 116 in rasters R0 and R1, respectively. The window is then advanced along the rasters one pixel at a time in a direction 118 to determine pseudo-gray levels for all of the individual pixels in the respective rasters R1 and R2. Effectively, therefore, the pixel values originally assigned to the rasters spanning the stitch juncture 55, that is, rasters R1 (including print data from the last nozzle of module 18a) and R2 (including print data from the first nozzle of module 18b), are blurred to obtain the pseudo-gray levels. These pseudo-gray levels are then used to obtain blurred gray level values corresponding to the print data in both the duplicated rasters, that is, rasters R0 and R1.

Figure 14:
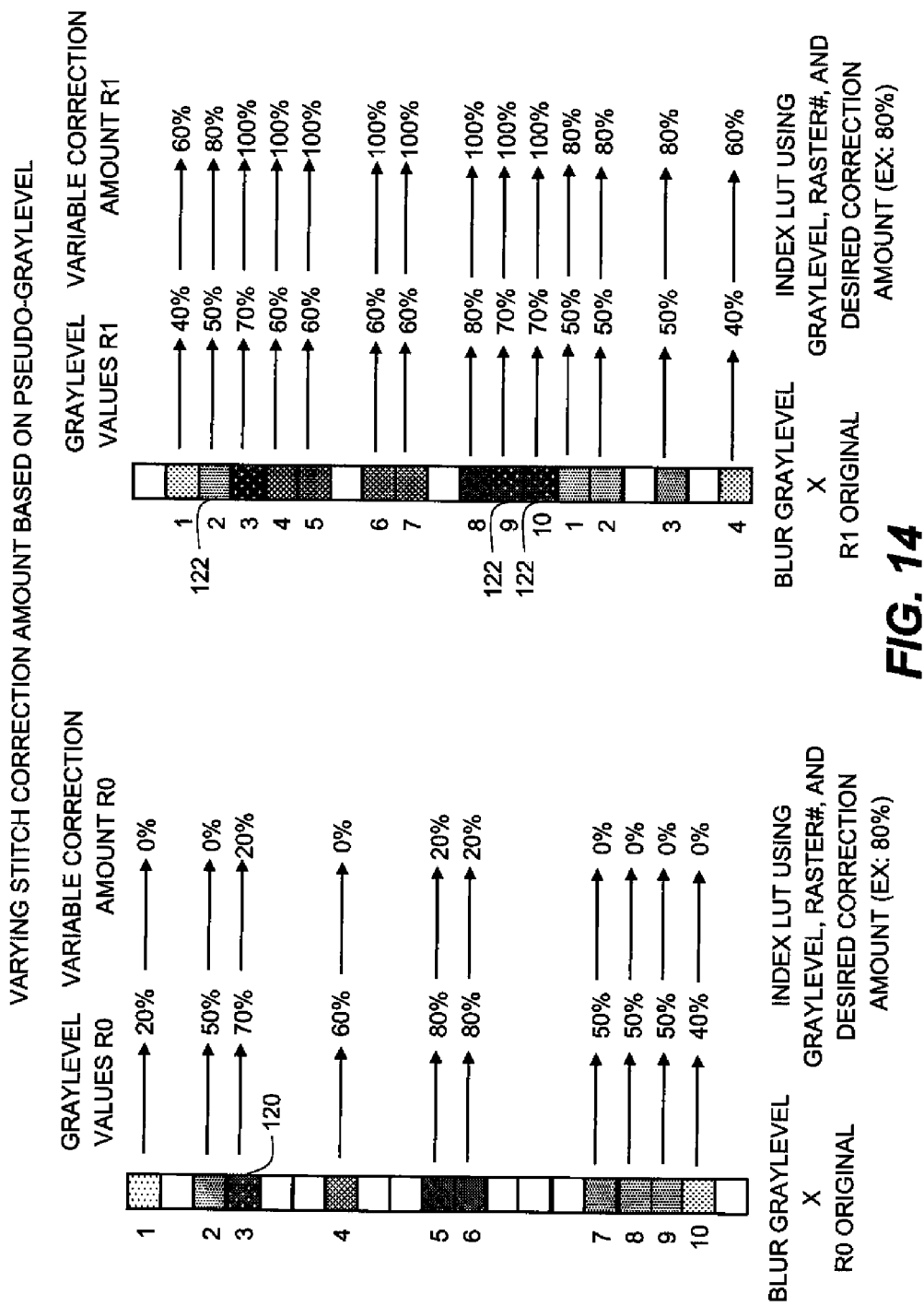
FIGS. 14 and 15 are diagrams that jointly illustrate an indexing process, according to the method shown in FIG. 11, using the pseudo-gray level associated with each printed pixel from FIG. 13 and the desired stitch correction to determine a further variable adjustment amount related to print density.
Figure 15:
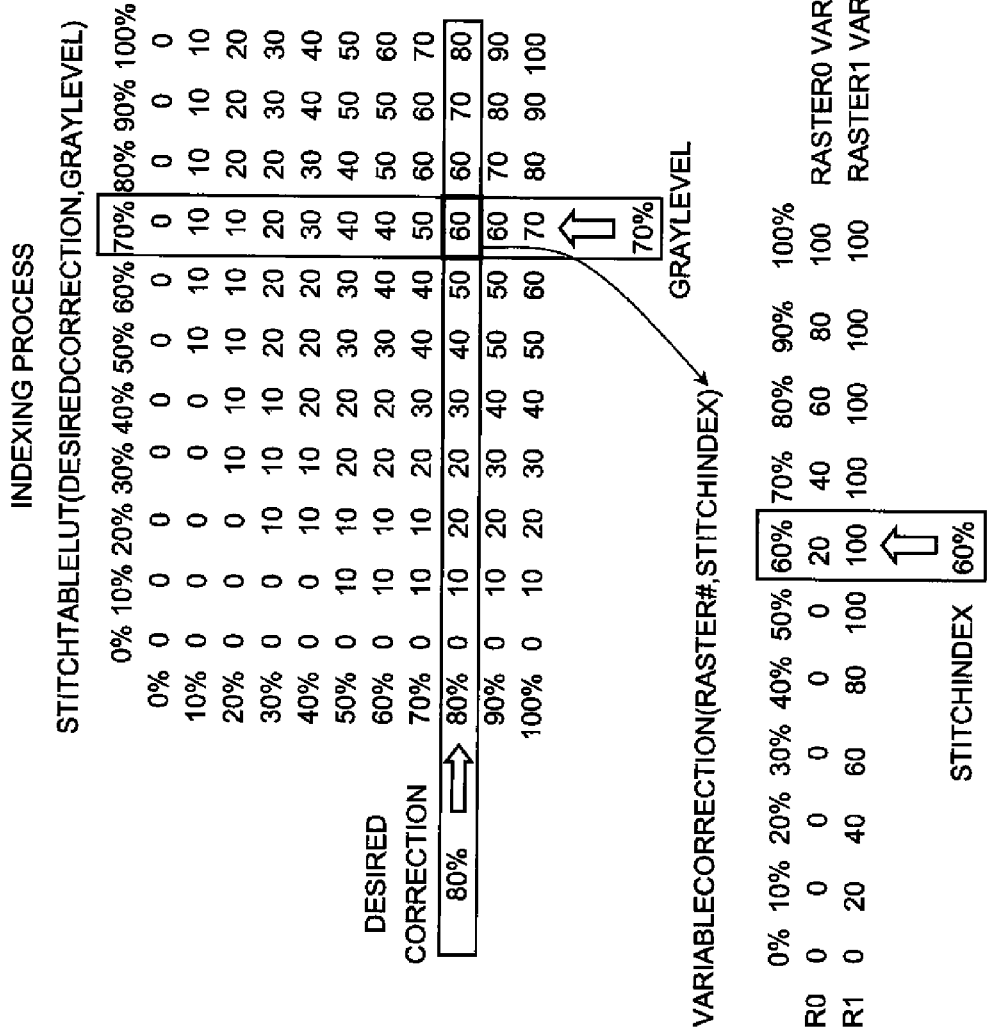

The process identified in stitch error stage 106 of FIG. 11 is accomplished as shown in FIGS. 14 and 15, in which an indexing process uses the pseudo-gray level associated with each printed pixel and the desired stitch correction amount to determine a variable correction amount related to print density. This is best understood by considering an example. For instance, and as shown in FIG. 15, if the desired stitch correction amount is 80%, pixels with a pseudo-gray level of 70% (e.g., pixels 120 and 122 in FIG. 14) will receive a variable correction amount of 20% if they are in raster R0 (pixel 120) and 100% if they are in raster R1 (pixels 122). These numbers are obtained by first indexing into the StitchTableLUT table shown in FIG. 15 using the desired stitch correction amount (e.g., 80%) and the pseudo-gray level (e.g., 70%), and then using the StitchIndex result (60, in this example) from the StitchTableLUT to index into the VariableCorrection table to obtain 20% for these pixels in raster R0 and 100% for these pixels in raster R1.

The StitchTableLUT and VariableCorrection tables are built based upon historical data, i.e., data showing correlation of a correction factor with a known degree of jetting module misalignment, where an alignment target is printed on the print medium 16 and measured as described earlier in connection with FIG. 3. For example, the desired correction may come from the fractional pixel alignment that is measured (i.e., an 80% correction would correspond to 80% of a pixel, so at 600 dpi that would equate to 33.9 microns) The ideal correction amount for each gray level is recorded in the table for this error amount (e.g., row 122 for an 80% correction).

Figure 16:
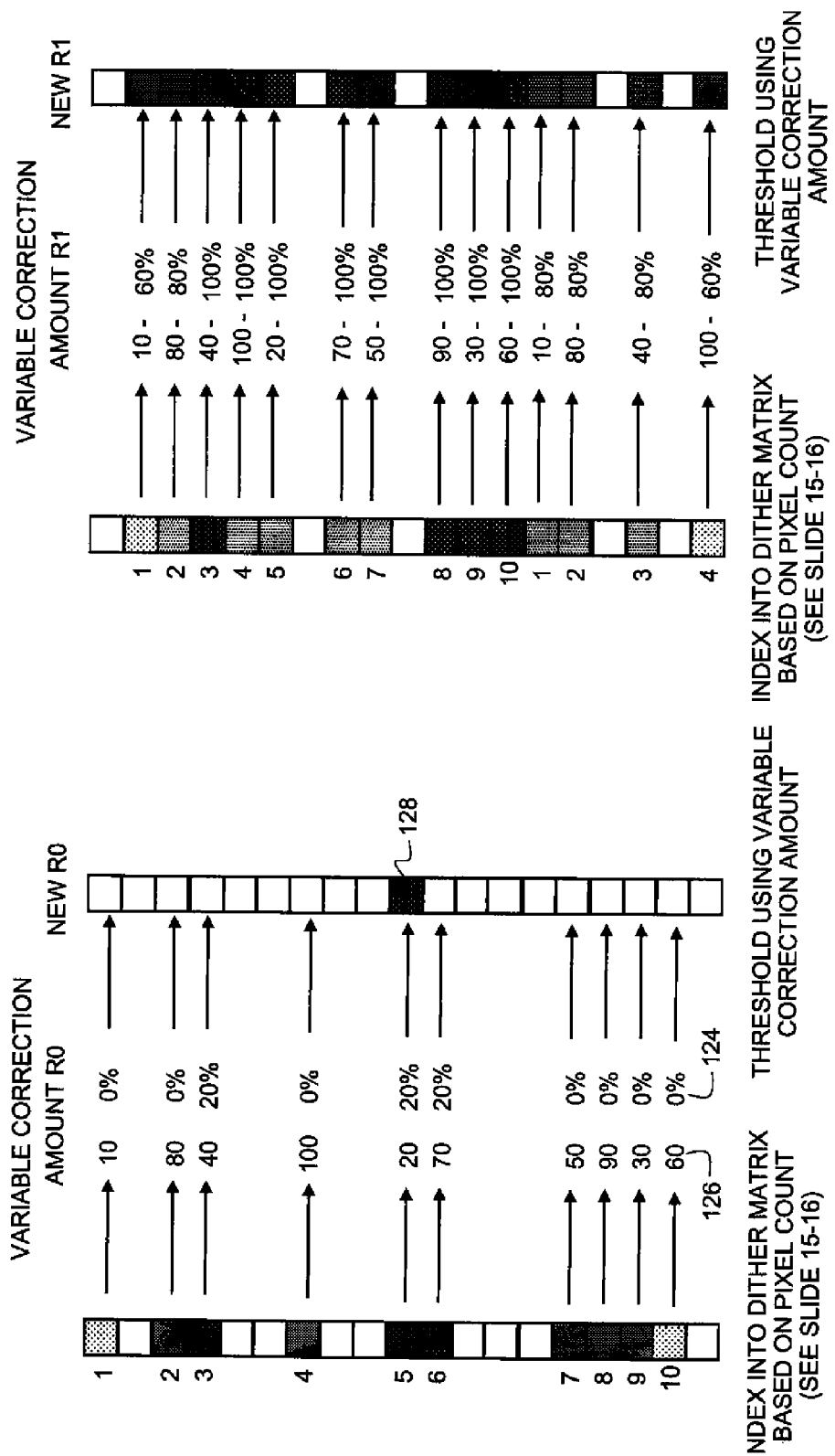
FIG. 16 is a diagram showing how the variable adjustment amount derived from FIGS. 14 and 15 is used, according to the method shown in FIG. 11, to modify a threshold dither matrix associated with the desired stitch correction in order to provide a stitch error correction that is dependent on the print density of the image data.

The process identified in modification stage 108 of FIG. 11 is accomplished as shown in FIG. 16, in which the variable correction matrix (amount) 124 derived from FIGS. 14 and 15 is used to threshold the threshold dither matrix 126 in order to determine which print data should be removed. More specifically, and as shown for a desired stitch correction of 80%, a correction threshold is applied based on the values in the variable correction matrix 124 to the threshold dither matrix 126 for the rasters R0 and R1. If the value from the threshold dither matrix 126 is greater than the value from the variable correction matrix 124, then the print data is removed for that pixel location. For example, for raster R0 only the pixel location 128 associated with a threshold matrix value of 20% and a variable correction of 20% is preserved as a print pixel because for all other values the value from the threshold dither matrix 126 is greater than the value from the variable correction matrix 124. For raster R1 the opposite condition prevails, because for all other values the value from the threshold dither matrix 126 is less than the value from the variable correction matrix 124.

It should be understood that FIGS. 12-16 represent one way, albeit presently preferred, for obtaining a desired stitch error correction amount that is dependent on the print density of the image data. Others techniques for accomplishing these results, and obtaining a desired stitch error correction amount that is dependent on the print density of the image data, would be apparent to one of ordinary skill in this art and are believed to fall within the claims in this application.

Figure 17:
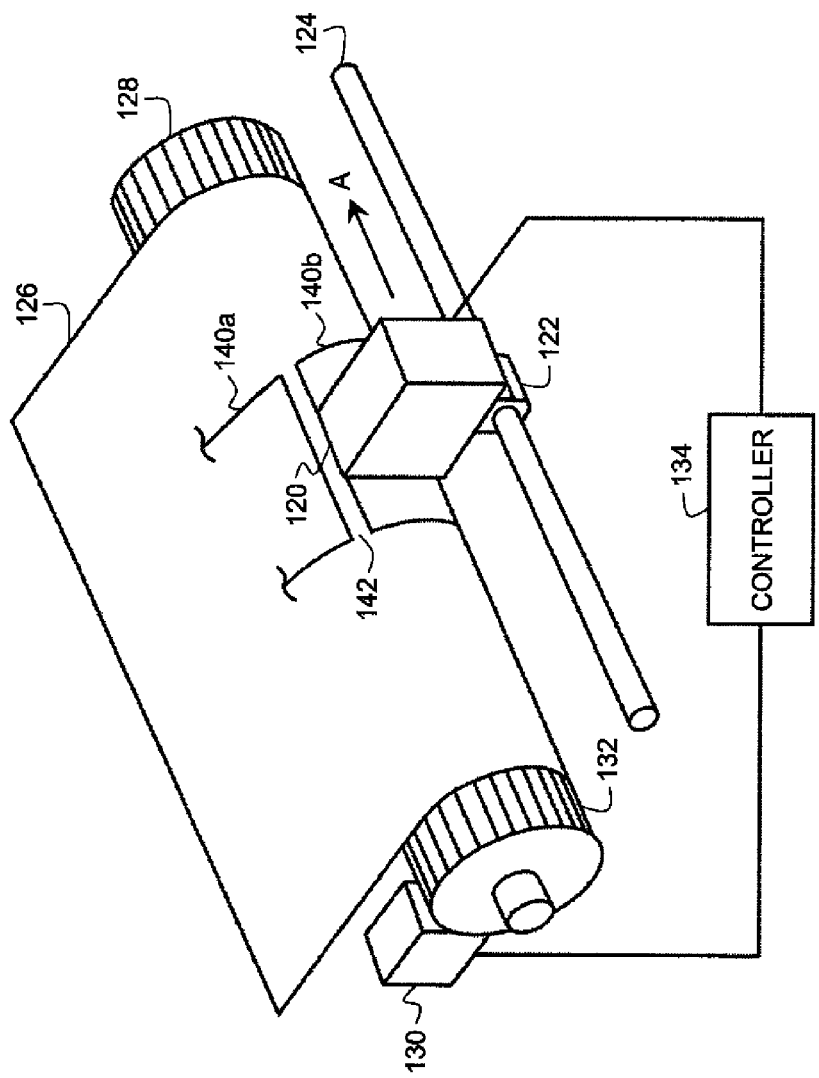
FIG. 17 shows a portion of a carriage-type, drop-on-demand inkjet printer that could incorporate the systems and methods of the invention.

FIG. 17 shows a portion of a carriage-type, drop-on-demand inkjet printer that could be adapted to incorporate the systems and methods of the invention. Such a carriage-type printer typically has a relatively small printhead 120 containing the ink channels and nozzles. The printhead 120 can be attached to a disposable ink supply cartridge (not shown). The combined printhead and cartridge assembly is attached to a carriage 122 that is reciprocated along a guide rod 124 in a first direction A and a second direction opposite the first direction A to print one swath of information at a time on a stationary receiving medium 126, such as paper or a transparency, supported on a platen 128. A sensor 130 detects marks 132 located on the platen 128, concerning the amount of rotation of the platen 128, which is output to the controller 134.

After a swath is printed, and based on information from the sensor 130 and the controller 134, the receiving medium 126 is stepped a distance at most equal to the height of a printed swath 140a so that the next printed swath 140b is contiguous or overlaps with the previously printed swath. This procedure is repeated until the entire image is printed. Stitch joint error can be, for example, the result of a gap 142 between the drop of one die or swath 140a adjacent the stitch joint and the drop of an adjoining swath 140b or die adjacent the stitch joint. The gap 142 is usually caused by difficulties in producing adjacent swaths close enough together to mask this apparent error. Although intended for continuous inkjet technology, the systems and methods of the invention could be adapted by one of ordinary skill in this art to provide a stitch masking algorithm to correct for such gaps produced by drop-on-demand printers.

The stitching algorithm 58 of the present invention has been described as being applied to stitching between jetting modules 18 that include nozzles 20 having a constant and identical nozzle to nozzle spacing. However, the stitching algorithm 58 of the present invention can also be applied with similar results to stitching between jetting modules 18 that include nozzles 20 having differing nozzle to nozzle spacing or jetting modules 18 that include nozzles 20 where the nozzle to nozzle spacing is different only in the overlap region. Likewise, the stitching algorithm 58 of the present invention can also be applied to stitching between jetting modules 18 where the nozzles 20 have constant and identical nozzle to nozzle spacing but the drop spacing in the overlap region varies due to the use of a drop deflection mechanism such as differential nozzle bore heating or air deflection.

The invention has been described in detail with particular reference to certain preferred embodiments thereof, but it will be understood that variations and modifications can be effected within the scope of the invention.

PARTS LIST

| | |
|---|---|
| Jetting module | 2 |
| Juncture | 2a |
| Line head | 4 |
| Nozzles | 6 |
| "White line" artifact | 8a |
| "Dark line" artifact | 8b |
| Printer | 10 |
| Housing | 12 |
| Line head | 14 |
| Receiver medium | 16 |
| Jetting modules | 18 |
| Nozzles | 20 |
| Printing nozzles | 20a |
| Nonprinting nozzles | 20b |
| Medium transport direction | 22 |
| Overlap region | 24 |
| Medium advance | 30 |
| Motor | 32 |
| Pinch rollers | 34 |
| Processor | 36 |
| User input system | 38 |
| Sensors | 40 |
| Memory | 42 |
| Display | 44 |
| Remote memory system | 50 |
| Stitching camera | 52 |
| Patch | 53a |
| Patch | 53b |
| Stitching target | 54 |
| Gap 54a | 54a |
| Stitch joint | 55 |
| Stitching camera processing system | 56 |
| Stitching algorithm | 58 |
| Printing stage | 60 |
| Capture stage | 62 |
| Analytic stage | 64 |
| Coarse correction stage | 66 |
| Sub-pixel correction stage | 68 |
| Correction transfer stage | 70 |
| Algorithm application stage | 72 |
| Dynamic adjustment stage | 74 |
| Verification stage | 76 |
| Counting stage | 80 |
| Indexing stage | 82 |
| Threshold stage | 84 |
| Elimination stage | 86 |
| target measurement and nominal masking stage | 100 |
| masking adjustment stage | 101 |
| web speed | 101a |
| Raster access stage | 102 |
| Gray level stage | 104 |
| Stitch error stage | 106 |
| Modification stage | 108 |

-continued

| | |
|---|---|
| Printhead | 120 |
| Carriage | 122 |
| Guide rod | 124 |
| Medium | 126 |
| Platen | 128 |
| Sensor | 130 |
| Marks | 132 |
| Controller | 134 |
| First swath | 140a |
| Second swath | 140b |
| Gap | 142 |

The invention claimed is:

1. A method of printing comprising the steps of:
providing a line head including a plurality of jetting modules that are staggered in a page-width direction such that adjacent jetting modules partially overlap each other, each of the plurality of jetting modules including a plurality of nozzles wherein some of the nozzles of adjacent jetting modules overlap each other;
applying test pattern print data to the line head for printing a test pattern on a print media using the nozzles of adjacent jetting modules;
analyzing the test pattern to detect a stitch error;
using the results of the analysis of the test pattern to calculate a set of correction values to be applied to print data subsequently sent to nozzles of the adjacent jetting modules to make a correction for the stitch error;
analyzing the print data subsequently sent to the nozzles of the adjacent jetting modules to sense an attribute of an image content of the print data;
using the results of the analysis of the image content attribute to calculate a dynamic adjustment that is used to adjust the set of correction values; and
using the line head to print corrected print data by applying the set of adjusted correction values to production print data subsequently sent to the jetting modules.

2. The method as claimed in claim 1 wherein the set of correction values is a printing mask that is to be applied to print data subsequently sent to nozzles of the adjacent jetting modules to make the correction for the stitch error, and the dynamic adjustment is applied to the printing mask when production print data is subsequently sent to the jetting modules.

3. The method as claimed in claim 2 wherein the image content attribute is a density value.

4. The method as claimed in claim 3 wherein the image content attribute is a gray level of regions of the image represented by the print data.

5. The method as claimed in claim 1 wherein the step of using the results of the analysis of the test pattern to calculate a set of correction values comprises the steps of:
using the results of the analysis of the test pattern to calculate a first set of correction values to be applied to print data subsequently sent to nozzles of one of the adjacent jetting modules to make a coarse correction for the stitch error; and
using the results of the analysis of the test pattern to calculate a second set of correction values to be applied to print data subsequently sent to one or more overlapping nozzles of one of the adjacent jetting modules to correct for sub-pixel stitch error.

6. The method as claimed in claim 5 wherein the step of using the results of the analysis of the image content attribute to calculate a dynamic adjustment that is used to adjust the set of correction values further comprises using the dynamic adjustment to adjust the second set of correction values.

7. The method as claimed in claim 1 wherein the adjusted correction values are applied to two or more nozzles of the adjacent jetting modules.

8. The method as claimed in claim 1 wherein the step of analyzing the print data subsequently sent to the nozzles of the adjacent jetting modules to sense an image content attribute of the print data further comprises the steps of:
- accessing one or more rasters of print data applied to one or more of the overlapping nozzles in adjacent jetting modules, wherein each raster comprises a column of print data printed by one printing nozzle in the page-length direction, that is, perpendicular to the page-width direction;
- calculating a pseudo-gray level for individual pixels in said one or more rasters by processing the print data from a pixel neighborhood within said one or more rasters including said individual pixel;
- using the pseudo-gray level to determine a stitch error correction amount related to print density; and
- using the stitch error correction amount related to print density to modify the set of correction values.

9. A method of printing comprising the steps of:
- providing a line head including a plurality of jetting modules that are staggered in a page-width direction such that adjacent jetting modules partially overlap each other, each of the plurality of jetting modules including a plurality of nozzles wherein some of the nozzles of adjacent jetting modules overlap each other;
- applying test pattern print data to the line head for printing a test pattern on a print media using the nozzles of adjacent jetting modules;
- analyzing the test pattern at least in the vicinity of the overlapping nozzles to detect a stitch error;
- using the results of the analysis of the test pattern to calculate a first set of correction values to be applied to print data subsequently sent to nozzles of one of the adjacent jetting modules to make a coarse correction for the stitch joint error;
- using the results of the analysis of the test pattern to calculate a second set of correction values to be applied to print data subsequently sent to one or more overlapping nozzles of one of the adjacent jetting modules to correct for sub-pixel stitch error, whereby the second set of correction values is proportional to print data applied to one or more of the overlapping nozzles; and
- using the line head to print the corrected print data by applying the first set and the second set of correction values to production print data subsequently sent to the jetting modules.

10. The method as claimed in claim 9 wherein the first set of correction values comprises instructions for shifting print data sent to nozzles of one of the adjacent jetting modules in the page-width direction to make the coarse correction for the stitch joint error.

11. The method as claimed in claim 10 wherein the print data sent to nozzles of one of the adjacent jetting modules comprises instructions for shifting the print data in one direction to coarsely correct for a dark line artifact and in the opposite direction to coarsely correct for a white line artifact.

12. The method as claimed in claim 9 wherein the step of analyzing the test pattern further comprises the step of automatically processing the test pattern to obtain measurements representative of the misalignment between adjacent jetting modules.

13. The method as claimed in claim 9 wherein the step of using the results of the analysis of the test pattern to calculate a second set of correction values comprises the step of applying the second set of correction values as a print mask to print data subsequently sent to one or more overlapping nozzles of one of the adjacent jetting modules to correct for sub-pixel stitch error, wherein the print mask selectively masks certain nozzles preventing such nozzles from printing even if print data for those nozzles should include an instruction to fire.

14. The method as claimed in claim 9 for use with printed output having variable levels of density, wherein the second set of correction values to be applied as a print mask to print data is adjusted based upon the density of an image represented by the print data.

15. A method of printing comprising the steps of:
- providing a line head including a plurality of jetting modules that are staggered in a page-width direction such that adjacent jetting modules partially overlap each other, each of the plurality of jetting modules including a plurality of nozzles wherein some of the nozzles of adjacent jetting modules overlap each other;
- printing a test pattern on a print media using the nozzles of adjacent jetting modules;
- analyzing the test pattern at least in the vicinity of the overlapping nozzles to detect a stitch error;
- using the results of the analysis of the test pattern to calculate a first set of correction values to be applied to print data subsequently sent to the nozzles of one of the adjacent jetting modules to make a coarse correction for the stitch joint error, whereby the coarse correction includes a shifting in print data in one of the adjacent jetting modules in the page-width direction;
- using the results of the analysis of the test pattern to calculate a second set of correction values to be applied as a print mask to print data subsequently sent to two or more of the overlapping nozzles of one of the adjacent jetting modules to correct for sub-pixel stitch error, wherein the print mask further includes a correction related to an image density of the print data; and
- using the line head to print the corrected print data by applying the first and second set of correction values to production print data subsequently sent to the jetting modules.

* * * * *